US010397691B2

(12) United States Patent
Vilhelmsen

(10) Patent No.: US 10,397,691 B2
(45) Date of Patent: Aug. 27, 2019

(54) AUDIO ASSISTED DYNAMIC BARCODE SYSTEM

(71) Applicant: Cubic Corporation, San Diego, CA (US)

(72) Inventor: Tom Vilhelmsen, Holbaek (DK)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/012,562

(22) Filed: Jun. 19, 2018

(65) Prior Publication Data

US 2018/0365915 A1    Dec. 20, 2018

Related U.S. Application Data

(60) Provisional application No. 62/537,560, filed on Jul. 27, 2017, provisional application No. 62/522,587, filed on Jun. 20, 2017.

(51) Int. Cl.
*G07C 9/00* (2006.01)
*G06K 7/10* (2006.01)
(Continued)

(52) U.S. Cl.
CPC ........... *H04R 1/222* (2013.01); *G06K 7/1095* (2013.01); *G07B 15/02* (2013.01);
(Continued)

(58) Field of Classification Search
CPC ........... G07C 9/00007; G07C 9/00015; G07C 9/00023; G07C 9/00119;
(Continued)

(56) References Cited

U.S. PATENT DOCUMENTS 5,973,613 A * 10/1999 Reis ................... G01S 13/74
340/10.2
8,335,318 B2   12/2012 Pan
(Continued)

FOREIGN PATENT DOCUMENTS

EP    2725536 A1    4/2014
EP    2922010 A2    9/2015
(Continued)

OTHER PUBLICATIONS

International Search Report and Written Opinion dated Sep. 20, 2018 in related application PCT/US2018/038439, all pages.
(Continued)

*Primary Examiner* — Edwin C Holloway, III
(74) *Attorney, Agent, or Firm* — Kilpatrick Townsend & Stockton

(57) ABSTRACT

Systems, methods, and devices for implementing an audio assisted dynamic barcode system. A gate validation system may include a barcode reader, a speaker, and a processor configured to perform operations including receiving, using the barcode reader, a first barcode from a portable electronic device indicating a request for passage through a gate. The operations may also include outputting, using the speaker, an audio signal having a predetermined feature. The operations may further include receiving, using the barcode reader, a second barcode from the portable electronic device indicating a detected feature of the audio signal. The operations may further include determining that the detected feature matches the predetermined feature and, in response to determining that the detected feature matches the predetermined feature, facilitating passage of a holder of the portable electronic device through the gate.

18 Claims, 15 Drawing Sheets

(51) Int. Cl.
| | | |
|---|---|---|
| *G07B 15/02* | (2011.01) | |
| *G10L 19/018* | (2013.01) | |
| *H04L 29/06* | (2006.01) | |
| *H04R 1/22* | (2006.01) | |
| *H04M 1/60* | (2006.01) | |
| *H04R 29/00* | (2006.01) | |
| *H04L 9/32* | (2006.01) | |
| *G09C 5/00* | (2006.01) | |
| *H04R 3/00* | (2006.01) | |
| G07B 15/04 | (2006.01) | |
| H04B 11/00 | (2006.01) | |
| H04M 1/725 | (2006.01) | |

(52) U.S. Cl.
CPC ..... *G07C 9/00007* (2013.01); *G07C 9/00031* (2013.01); *G07C 9/00309* (2013.01); *G09C 5/00* (2013.01); *G10L 19/018* (2013.01); *H04L 9/3271* (2013.01); *H04L 63/0853* (2013.01); *H04M 1/6008* (2013.01); *H04R 3/00* (2013.01); *H04R 29/004* (2013.01); *G07B 15/04* (2013.01); *G07C 2009/00388* (2013.01); *G07C 2009/00412* (2013.01); *H04B 11/00* (2013.01); *H04M 1/72522* (2013.01); *H04R 2410/00* (2013.01); *H04R 2499/11* (2013.01)

(58) Field of Classification Search
CPC .. G07C 2009/0023; G07C 2009/00238; G07C 2009/00246; G07C 2009/00253; G07C 2009/00388; G07C 2009/00412; G07C 2009/0042; G07C 2009/00428; G07C 2009/00436; G07C 2009/00444; G07C 2009/00452; G07C 2009/0046; G07C 2009/00468; G07C 2009/00476; G07C 2009/00753; G07C 2009/00785; G07C 2009/00801; G07C 1/32; G07B 15/02; G06K 7/1095; G10L 19/018; H04L 63/0853; E05B 17/0083; G08C 2201/93
USPC ....................................................... 340/5.61
See application file for complete search history.

(56) References Cited

U.S. PATENT DOCUMENTS

| | | | | |
|---|---|---|---|---|
| 9,824,678 | B1 | 11/2017 | Ou | |
| 2003/0066883 | A1* | 4/2003 | Yu | G06K 7/1095 235/382 |
| 2004/0143737 | A1* | 7/2004 | Teicher | G06K 7/1095 713/167 |
| 2007/0265038 | A1* | 11/2007 | Kim | H04M 1/7253 455/567 |
| 2009/0010447 | A1 | 1/2009 | Waite et al. | |
| 2009/0034746 | A1 | 2/2009 | Nozaki | |
| 2009/0247152 | A1* | 10/2009 | Manne | H04M 11/066 455/426.2 |
| 2010/0053169 | A1* | 3/2010 | Cook | G06F 3/16 345/440.1 |
| 2010/0279610 | A1* | 11/2010 | Bjorhn | G06Q 20/20 455/41.2 |
| 2011/0139874 | A1* | 6/2011 | Fu | H04N 1/32122 235/462.01 |
| 2012/0068818 | A1* | 3/2012 | Mizon | G07C 9/00007 340/5.61 |
| 2012/0138693 | A1* | 6/2012 | Litz | G06K 7/1095 235/494 |
| 2012/0268241 | A1* | 10/2012 | Hanna | G06F 21/32 340/5.52 |
| 2013/0122810 | A1* | 5/2013 | Kaufman | H04W 4/21 455/41.2 |
| 2014/0108252 | A1* | 4/2014 | Itwaru | G06Q 20/202 705/44 |
| 2014/0117075 | A1* | 5/2014 | Weinblatt | G06Q 20/02 235/375 |
| 2016/0353196 | A1 | 12/2016 | Baker et al. | |
| 2017/0254726 | A1 | 9/2017 | Das et al. | |
| 2017/0323630 | A1 | 11/2017 | Stickney et al. | |

FOREIGN PATENT DOCUMENTS

| | | | | |
|---|---|---|---|---|
| GB | 2520307 | A * | 5/2015 | ........... G06K 7/1408 |
| WO | 2016025402 | A1 | 2/2016 | |

OTHER PUBLICATIONS

Greg Kumparak: "SlickLogin Aims To Kill The Password By Singing A Silent Song To Your Smartphone: TechCrunch 11", retrieved from url: https://techcrunch.com/2013/09/09/slicklogin-wants-to-kill-the-password-by-singing-a-silent-song-to-your-smartphone/, Sep. 9, 2013, all pages.

Non Final office action dated Sep. 27, 2018 in related application U.S. Appl. No. 16/012,556, all pages.

* cited by examiner

AUDIO ASSISTED DYNAMIC BARCODE SYSTEM

CROSS-REFERENCES TO RELATED APPLICATIONS

This application claims priority to U.S. Provisional Patent Application No. 62/537,560 filed Jul. 27, 2017 titled "FAST DETERMINATION OF THE FREQUENCY OF A RECEIVED AUDIO SIGNAL BY MOBILE PHONE", and U.S. Provisional Patent Application No. 62/522,587, filed Jun. 20, 2017 titled "AUDIO ASSISTED DYNAMIC BARCODE SYSTEM", the entire disclosures of which are hereby incorporated by reference, for all purposes, as if fully set forth herein.

This application is related to U.S. patent application Ser. No. 16/012,556, filed Jun. 19, 2018 titled "FAST DETERMINATION OF A FREQUENCY OF A RECEIVED AUDIO SIGNAL BY MOBILE PHONE."

BACKGROUND OF THE INVENTION

As populations in the world's largest city centers continue to grow, often at an exponential rate, public and private transportation systems are becoming increasingly burdened with increased ridership and transit stations are becoming increasingly congested, causing delays to transit users and increased costs to the transportation systems. The use of sophisticated communication devices presents an appealing approach for managing such overcrowding. Unfortunately, existing devices and approaches are insufficient to alleviate these problems. Accordingly, new systems, methods, and other techniques are needed.

SUMMARY OF THE INVENTION

Examples given below provide a summary of the present invention. As used below, any reference to a series of examples is to be understood as a reference to each of those examples disjunctively (e.g., "Examples 1-4" is to be understood as "Examples 1, 2, 3, or 4").

Example 1 is a gate validation system comprising: a barcode reader; a speaker; and a processor communicatively coupled to the barcode reader and the speaker, wherein the processor is configured to perform operations comprising: receiving, using the barcode reader, a first barcode from a portable electronic device indicating a request for passage through a gate; outputting, using the speaker, an audio signal having a predetermined feature; receiving, using the barcode reader, a second barcode from the portable electronic device indicating a detected feature of the audio signal; determining that the detected feature matches the predetermined feature; and in response to determining that the detected feature matches the predetermined feature, facilitating passage of a holder of the portable electronic device through the gate.

Example 2 is the gate validation system of example(s) 1, wherein one or both of the first barcode and the second barcode further indicate an identifier corresponding to the holder of the portable electronic device.

Example 3 is the gate validation system of example(s) 2, wherein facilitating passage of the holder of the portable electronic device through the gate includes storing either an entry record or an exit record including the identifier corresponding to the holder of the portable electronic device.

Example 4 is the gate validation system of example(s) 1, wherein the first barcode and the second barcode are encrypted using a key.

Example 5 is the gate validation system of example(s) 4, wherein the key is based of one or more of: a location of the gate; a time of day; a day of a week; and a gate serial number.

Example 6 is the gate validation system of example(s) 4, wherein the operations further comprise: decrypting the first barcode using the key; and decrypting the second barcode using the key.

Example 7 is the gate validation system of example(s) 1, wherein the predetermined feature is one or more of: a frequency of the audio signal; a phase of the audio signal; an amplitude of the audio signal; a duration of the audio signal; and a message modulated onto the audio signal.

Example 8 is a method comprising: receiving, using a barcode reader, a first barcode from a portable electronic device indicating a request for passage through a gate; outputting, using a speaker, an audio signal having a predetermined feature; receiving, using the barcode reader, a second barcode from the portable electronic device indicating a detected feature of the audio signal; determining that the detected feature matches the predetermined feature; and in response to determining that the detected feature matches the predetermined feature, facilitating passage of a holder of the portable electronic device through the gate.

Example 9 is the method of example(s) 8, wherein one or both of the first barcode and the second barcode further indicate an identifier corresponding to the holder of the portable electronic device.

Example 10 is the method of example(s) 9, wherein facilitating passage of the holder of the portable electronic device through the gate includes storing either an entry record or an exit record including the identifier corresponding to the holder of the portable electronic device.

Example 11 is the method of example(s) 8, wherein the first barcode and the second barcode are encrypted using a key.

Example 12 is the method of example(s) 11, wherein the key is based of one or more of: a location of the gate; a time of day; a day of a week; and a gate serial number.

Example 13 is the method of example(s) 11, further comprising: decrypting the first barcode using the key; and decrypting the second barcode using the key.

Example 14 is the method of example(s) 8, wherein the predetermined feature is one or more of: a frequency of the audio signal; a phase of the audio signal; an amplitude of the audio signal; a duration of the audio signal; and a message modulated onto the audio signal.

Example 15 is a non-transitory computer-readable medium comprising instructions that, when executed by a processor, cause the processor to perform operations comprising: receiving, using a barcode reader, a first barcode from a portable electronic device indicating a request for passage through a gate; outputting, using a speaker, an audio signal having a predetermined feature; receiving, using the barcode reader, a second barcode from the portable electronic device indicating a detected feature of the audio signal; determining that the detected feature matches the predetermined feature; and in response to determining that the detected feature matches the predetermined feature, facilitating passage of a holder of the portable electronic device through the gate.

Example 16 is the non-transitory computer-readable medium of example(s) 15, wherein one or both of the first barcode and the second barcode further indicate an identifier corresponding to the holder of the portable electronic device.

Example 17 is the non-transitory computer-readable medium of example(s) 16, wherein facilitating passage of the holder of the portable electronic device through the gate includes storing either an entry record or an exit record including the identifier corresponding to the holder of the portable electronic device.

Example 18 is the non-transitory computer-readable medium of example(s) 15, wherein the first barcode and the second barcode are encrypted using a key.

Example 19 is the non-transitory computer-readable medium of example(s) 18, wherein the key is based of one or more of: a location of the gate; a time of day; a day of a week; and a gate serial number.

Example 20 is the non-transitory computer-readable medium of example(s) 18, wherein the operations further comprise: decrypting the first barcode using the key; and decrypting the second barcode using the key.

Example 21 is a portable electronic device comprising: a microphone; a speaker; and a processor communicatively coupled to the microphone and the speaker, wherein the processor is configured to perform operations comprising: receiving, using the microphone, a first audio signal having a predetermined frequency; and for each test frequency of a plurality of test frequencies and for each test phase of a plurality of test phases: generating a second audio signal having the test frequency and the test phase; outputting, using the speaker, the second audio signal; receiving, using the microphone, a combined audio signal being a combination of the first audio signal and the second audio signal; determining an amplitude of the combined audio signal; and determining that the predetermined frequency is within a threshold range of the test frequency when the amplitude of the combined audio signal is below a threshold.

Example 22 is the portable electronic device of example(s) 21, wherein the operations further comprise: determining an amplitude of the first audio signal, wherein the second audio signal is generated such that an amplitude of the second audio signal is equal to an amplitude of the first audio signal.

Example 23 is the portable electronic device of example(s) 21, wherein the operations further comprise: determining the plurality of test frequencies based on one or more of: a location of the portable electronic device; a time of day; and a day of a week.

Example 24 is the portable electronic device of example(s) 21, wherein the plurality of test phases comprise evenly spaced phases between 0 degrees and 360 degrees.

Example 25 is the portable electronic device of example(s) 24, wherein the plurality of test phases include 0 degrees, 90 degrees, 180 degrees, and 270 degrees.

Example 26 is the portable electronic device of example(s) 21, wherein the operations further comprise: in response to determining that the predetermined frequency is within the threshold range of the test frequency: generating a second plurality of test frequencies within the threshold range; and for each test frequency of the second plurality of test frequencies and for each test phase of a second plurality of test phases: generating a third audio signal having the test frequency and the test phase; outputting, using the speaker, the third audio signal; receiving, using the microphone, a second combined audio signal being a combination of the first audio signal and the third audio signal; determining an amplitude of the second combined audio signal; and determining that the predetermined frequency is within a second threshold range of the test frequency when the amplitude of the second combined audio signal is below a second threshold.

Example 27 is the portable electronic device of example(s) 21, wherein the operations further comprise: determining an amplitude of the first audio signal; and determining the plurality of test frequencies based on the amplitude of the first audio signal.

Example 28 is a method comprising: receiving, using a microphone, a first audio signal having a predetermined frequency; and for each test frequency of a plurality of test frequencies and for each test phase of a plurality of test phases: generating a second audio signal having the test frequency and the test phase; outputting, using a speaker, the second audio signal; receiving, using the microphone, a combined audio signal being a combination of the first audio signal and the second audio signal; determining an amplitude of the combined audio signal; and determining that the predetermined frequency is within a threshold range of the test frequency when the amplitude of the combined audio signal is below a threshold.

Example 29 is the method of example(s) 28, further comprising: determining an amplitude of the first audio signal, wherein the second audio signal is generated such that an amplitude of the second audio signal is equal to an amplitude of the first audio signal.

Example 30 is the method of example(s) 28, further comprising: determining the plurality of test frequencies based on one or more of: a location of a portable electronic device; a time of day; and a day of a week.

Example 31 is the method of example(s) 28, wherein the plurality of test phases comprise evenly spaced phases between 0 degrees and 360 degrees.

Example 32 is the method of example(s) 31, wherein the plurality of test phases include 0 degrees, 90 degrees, 180 degrees, and 270 degrees.

Example 33 is the method of example(s) 28, further comprising: in response to determining that the predetermined frequency is within the threshold range of the test frequency: generating a second plurality of test frequencies within the threshold range; and for each test frequency of the second plurality of test frequencies and for each test phase of a second plurality of test phases: generating a third audio signal having the test frequency and the test phase; outputting, using the speaker, the third audio signal; receiving, using the microphone, a second combined audio signal being a combination of the first audio signal and the third audio signal; determining an amplitude of the second combined audio signal; and determining that the predetermined frequency is within a second threshold range of the test frequency when the amplitude of the second combined audio signal is below a second threshold.

Example 34 is the method of example(s) 28, further comprising: determining an amplitude of the first audio signal; and determining the plurality of test frequencies based on the amplitude of the first audio signal.

Example 35 is a non-transitory computer-readable medium comprising instructions that, when executed by a processor, cause the processor to perform operations comprising: receiving, using a microphone, a first audio signal having a predetermined frequency; and for each test frequency of a plurality of test frequencies and for each test phase of a plurality of test phases: generating a second audio signal having the test frequency and the test phase; outputting, using a speaker, the second audio signal; receiving, using the microphone, a combined audio signal being a combination of the first audio signal and the second audio signal; determining an amplitude of the combined audio signal; and determining that the predetermined frequency is within a threshold range of the test frequency when the amplitude of the combined audio signal is below a threshold.

Example 36 is the non-transitory computer-readable medium of example(s) 35, further comprising: determining an amplitude of the first audio signal, wherein the second audio signal is generated such that an amplitude of the second audio signal is equal to an amplitude of the first audio signal.

Example 37 is the non-transitory computer-readable medium of example(s) 35, further comprising: determining the plurality of test frequencies based on one or more of: a location of a portable electronic device; a time of day; and a day of a week.

Example 38 is the non-transitory computer-readable medium of example(s) 35, wherein the plurality of test phases comprise evenly spaced phases between 0 degrees and 360 degrees.

Example 39 is the non-transitory computer-readable medium of example(s) 38, wherein the plurality of test phases include 0 degrees, 90 degrees, 180 degrees, and 270 degrees.

Example 40 is the non-transitory computer-readable medium of example(s) 35, further comprising: in response to determining that the predetermined frequency is within the threshold range of the test frequency: generating a second plurality of test frequencies within the threshold range; and for each test frequency of the second plurality of test frequencies and for each test phase of a second plurality of test phases: generating a third audio signal having the test frequency and the test phase; outputting, using the speaker, the third audio signal; receiving, using the microphone, a second combined audio signal being a combination of the first audio signal and the third audio signal; determining an amplitude of the second combined audio signal; and determining that the predetermined frequency is within a second threshold range of the test frequency when the amplitude of the second combined audio signal is below a second threshold.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
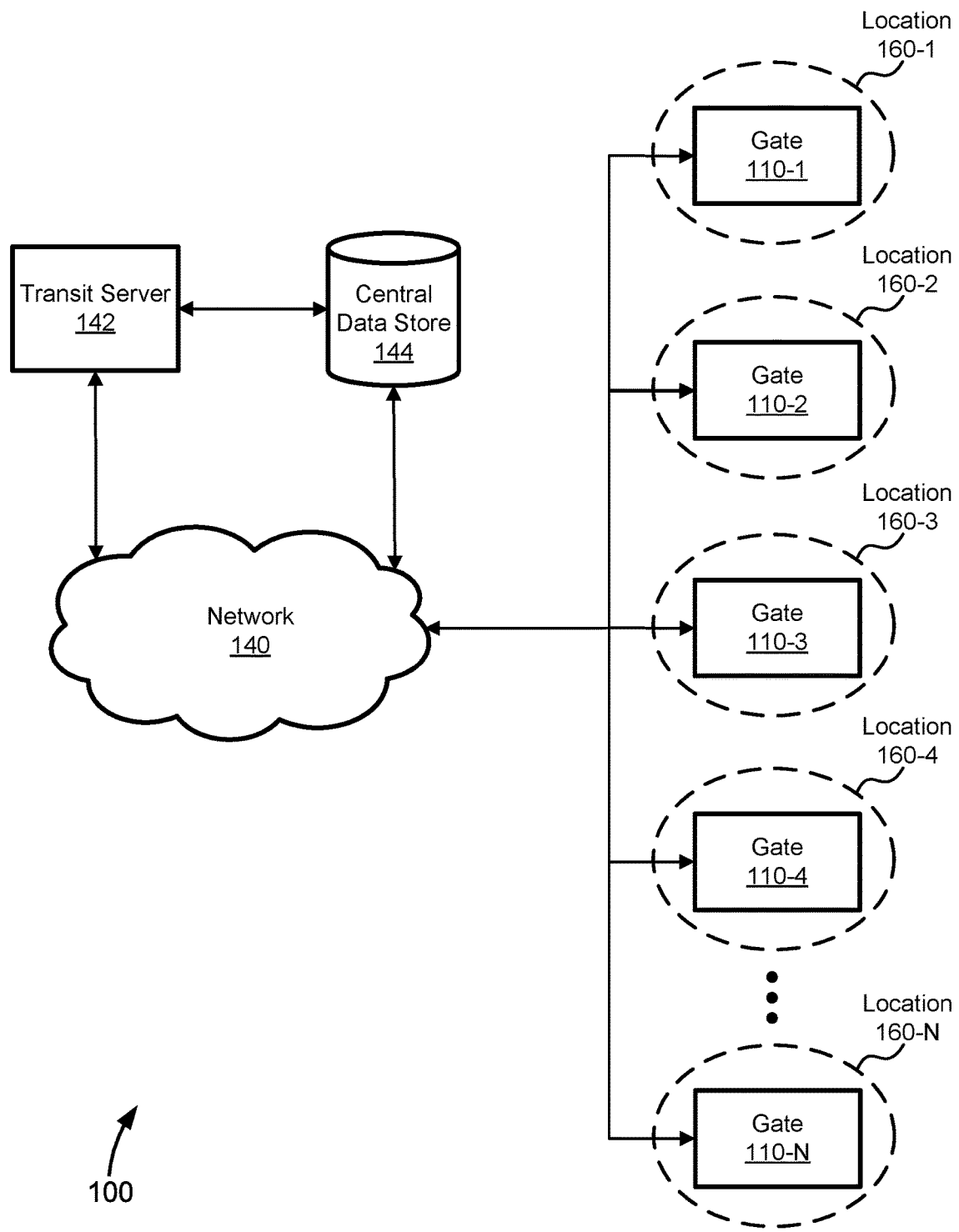
FIG. 1 illustrates a block diagram of a transit system, according to some embodiments of the present disclosure.

Embodiments of the present disclosure include systems, methods, and other techniques for implementing an audio assisted dynamic barcode system. Although embodiments described herein are generally related to a barcode system utilized for ticketing (e.g., in transit systems and/or other venues), applications may extend beyond the usage of barcodes in ticketing to virtually everywhere a barcode is read. Furthermore, as will be described, some embodiments herein include systems, methods, and other techniques for determining a frequency of a received audio signal. As such, some embodiments described herein may relate to any application in which audio signals are received by a device or system, such as reception of dual tone multi frequency (DTMF) from a traditional public switched telephone network (PSTN) telephone to capture the dialed number, detection of audio alarms to send a message over a mobile phone, receiving facsimile on a mobile phone, among other possibilities.

Traditional barcode systems typically utilize a barcode issued on a mobile phone or a piece of paper, which can be easily copied by another mobile phone and subsequently used. The main protection mechanism in these traditional systems is to detect the first usage and communicate that usage to all barcode readers/validators in the system such that they can reject the copied barcode when presented. However, the disadvantage with this solution is that the time taken to distribute the usage transaction to all validators/barcode readers can be (relatively) quite large. Furthermore, the copy might be used prior to the genuine barcode.

Embodiments of the present invention address these and other issues by providing an audio assisted dynamic barcode system that utilizes audio to ensure a high degree of authenticity between the mobile phone (e.g., barcode carrier) and the barcode reader. More specifically, authenticity of the barcode may be protected by transmitting an audiocode from the barcode reader to the mobile phone for it to create an authentic and unique dynamic barcode. Here, audio can be used to transmit the audiocode as a means of authenticating the original barcode because many electronic devices, such as mobile phones, have microphones, and will be able to decode it seamlessly. Additionally or alternatively, other means can be used like optical images, electromagnetic transmissions (e.g., Bluetooth or Near field communication—NFC), although fewer electronic devices may be able to receive and respond to these other means.

In some embodiments, the audiocode transmitted from the barcode reader to the mobile phone may include a predetermined frequency that the mobile phone may need to detect. Embodiments described herein utilize a novel process to provide a fast determination of the frequency by transmitting a reversed signal (same frequency, same amplitude, opposite phase) of a received signal and observing the signal envelope has decreased in amplitude below a certain threshold due to audio signal cancellation. The effect is that two different signals with the same amplitude and frequency but with opposite phases will cancel out each other and the resulting amplitude is reduced significantly. The reduction in amplitude is the trigger for the mobile phone application that the two frequencies are identical. Depending on the application, there may be 100-200 different distinct frequencies that may be scanned. Other applications may have a larger or smaller amount of frequencies. In some applications, only a relatively small amount of frequencies may be needed. In the case of audio authentication of a barcode, for example, perhaps only 10 distinct predetermined frequencies may be used because the frequency may change depending on the time of day, barcode reader or gate serial number, and/or other factors, thereby helping reducing the likelihood of fraud even when only a relatively small number of distinct frequencies are used.

Embodiments of the present invention can provide various advantages over traditional methods. For example, embodiments can greatly help to increase fraud prevention. Additionally or alternatively, embodiments may provide an instantaneous, or real-time, authentication check and, if the presented initial barcode is a copy of another barcode, it will be determined that the mobile phone does not present a signature of the audiocode after the initial barcode and therefore no access will be allowed. Therefore, embodiments can detect virtually all fraud when using barcodes on a mobile phone.

FIG. 1 illustrates a block diagram of a transit system 100, according to some embodiments of the present disclosure. Transit system 100 may include a plurality of gates 110 located at a plurality of locations 160 (alternatively referred to herein as transit locations 160). Each of locations 160 may include a non-restricted access area and a restricted access area. The non-restricted access area may include areas that are freely accessible to the general public, whereas the restricted access area may be reserved exclusively for customers of transit system 100. Examples of a restricted access area may include: the inside of a bus or train, a bus or train platform, the inside of a bus or train station, and the like. Each of locations 160 may include a single or multiple gates 110, and in some embodiments each of gates 110 may include an entry point that defines a passageway and separates the non-restricted access area from the restricted access area. Each of gates 110 may be communicatively coupled to a network 140 via one or more wired and/or wireless connections. Transit system 100 may also include a transit server 142 and a central data store 144, each of which may be communicatively coupled to network 140. Transit server 142 may include a single or multiple processors, and may write, retrieve, or store data to central data store 144 or any of gates 110. Although embodiments herein are described in reference to transit systems, the restricted access area may correspond to an entertainment venue, a building, or any location involving metered access.

Figure 2:
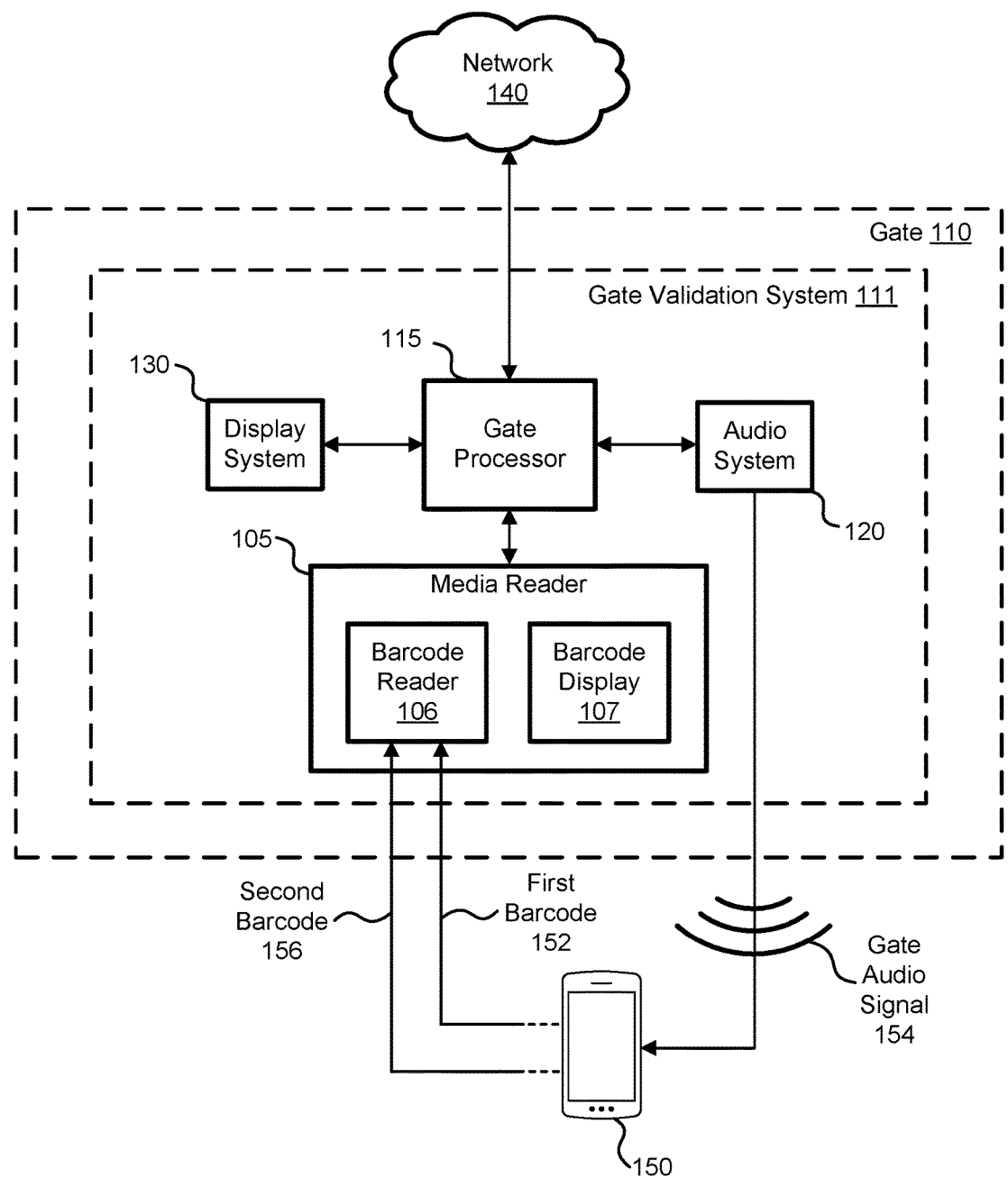
FIG. 2 illustrates a block diagram of a portable electronic device in communication with a gate in communication with a network, according to some embodiments of the present disclosure.

FIG. 2 illustrates a block diagram of a portable electronic device 150 in communication with gate 110 in communication with network 140, according to some embodiments of the present disclosure. Gate 110 may be equipped with a gate validation system 111 for determining whether a holder of portable electronic device 150 is allowed to access the restricted access area and/or for facilitating the passage of the holder of portable electronic device 150 through gate 110. Accordingly, gate 110 may serve as one of several possible entry points into transit system 100 (i.e., the restricted access area of transit system 100). One of ordinary skill in the art will recognize that gate 110 can vary in appearance and functionality. In some embodiments, gate 110 includes a media reader 105 whereby portable electronic device 150 does not have to make contact with media reader 105 to communicate. For example, media reader 105 may include a barcode reader 106 and a barcode display 107. In some embodiments, gate 110 includes an audio system 120 which can give verbal instructions on using any of the components of gate 110. For instance, in some embodiments audio system 120 can alert the holder of portable electronic device 150 that portable electronic device 150 is not correctly placed to communicate with media reader 105.

In some embodiments, gate 110 includes a gate processor 115 in communication with network 140. Gate processor 115 may include a single or multiple processors and an associated memory. Gate processor 115 may communicate with a display system 130 and provide the messaging presented on display system 130. Gate processor 115 can generate the messages to be displayed on display system 130 or receive the message to be displayed from any number of sources over network 140. Gate processor 115 may also communicate with audio system 120 and may generate the messages broadcast from audio system 120 or receive the message to be broadcast from any number of sources over the network 140. Gate processor 115 may communicate with media reader 105 and may determine if portable electronic device 150 allows passage or may send information received from portable electronic device 150 over network 140 to transit server 142 to make the determination. In response to a communication error between media reader 105 and portable electronic device 150, gate processor 115 may communicate with media reader 105 and relay information from and to the other systems such as to audio system 120 to give an audio indication that portable electronic device 150 is not correctly placed.

In some embodiments, display system 130 may display a message for the holder of portable electronic device 150 that the fare media is not in the correct place and can identify to the holder of portable electronic device 150 where to correctly place portable electronic device 150 to allow proper communication. In some embodiments, display system 130 can display any manner of other messages including instructions for using gate 110, instructions for using transit system 100, and advertising. In various embodiments, media reader 105 may comprise a contactless reader and/or a reader that requires contact with the object to be read. In some embodiments, media reader 105 may communicate with portable electronic device 150 at a considerable distance. One of skill in the art will recognize that barriers associated with gate 110 may open up to allow the holder of portable electronic device 150 passage upon a successful communication between media reader 105 and portable electronic device 150.

In some embodiments, each of media reader 105 and portable electronic device 150 may be configured to read and display barcodes containing encrypted or unencrypted data. For example, barcode display 107 may display a barcode that may be read by a barcode reader of portable electronic device 150, and conversely, a barcode display of portable electronic device 150 may display a barcode that may be read by barcode reader 106. The barcode displays of media reader 105 and portable electronic device 150 may include any type of electronic display. The barcode readers of media reader 105 and portable electronic device 150 may include cameras, laser scanners, charge-coupled device (CCD) readers, among other possibilities. In one particular implementation, portable electronic device 150 is a smart phone having a camera and digital display that are used as a barcode reader and barcode display, respectively.

In some embodiments, communication between media reader 105 and portable electronic device 150 may utilize the transmission and reception of electromagnetic wireless signals. For example, the two devices may communicate using near-field communication (NFC), Bluetooth low energy (BLE), radio-frequency identification (RFID), and the like. In some embodiments, media reader 105 may include an RFID reader and portable electronic device 150 may include an RFID tag. The RFID tag may be may be passive, active, or battery-assisted passive. Active RFID tags have on-board batteries and periodically or constantly transmit wireless signals with identifying information. Battery-assisted passive RFID tags have small batteries on board and are activated when they are near an RFID reader. Passive RFID tags lack on-board batteries and are instead energized by the wireless signals received from RFID readers. RFID tags may have individual serial numbers or IDs that allow each individual RFID tag to be identified from among a larger group. In some embodiments, an RFID tag may be a credit card sized carrier or a key fob. RFID tags may operate in a 13.56 MHz band (HF), a 900 MHz band (UHF), or a 2.4 GHz band, among others. In some embodiments, UHF tags may co-exist with HF tags and vice-versa. In some embodiments, active RFID tags may be turned on and off by a user pressing a button on or near the RFID tag. For example, a wheelchair user may press a button fixed to their wheelchair to power an active RFID tag. Such embodiments may save power and preserve battery life.

In some embodiments, portable electronic device 150 may include (directly or indirectly via e.g., information linking to an external location) an amount of units which may be used to access transit system 100. For example, passage through different routes within transit system 100 may cause different amounts of units to be deleted from portable electronic device 150 (or from the external location). In some embodiments, transit server 142 or some external processor may cause some portion of the amount of units to be held as unavailable. When a portion of units is held as unavailable, that portion may not be used for other purposes outside transit system 100 such that the portion is locked from usage. In one particular implementation, the amount of units may correspond to money (e.g., a cash amount) usable for financial transactions such as the purchase of a fare within transit system 100. In various embodiments, portable electronic device 150 may be a smart phone, a personal digital assistant (PDA), or a tablet. In some embodiments, portable electronic device 150 may be used in place of a payment card (e.g., credit card, debit card, card issued by transit system 100, etc.).

In some embodiments, upon a holder of portable electronic device 150 arriving at gate 110, portable electronic device 150 may be caused to display a first barcode 152. First barcode 152 may indicate a request to enter or exit transit system 100 through gate 110 as well as an identifier corresponding to the holder of portable electronic device 150. Barcode reader 106 may read first barcode 152 and may send encrypted or unencrypted data contained in first barcode 152 to gate processor 115. Encrypted data may be decrypted by gate processor 115 (or by media reader 105) using a key. The key may be based on the identifier corresponding to the holder of portable electronic device 150. For example, each customer of transit system 100 may have a different key that is generated when a customer first uses transit system 100. The key may thereafter be modified at predetermined intervals. Alternatively or additionally, the key may be based on location 160 of gate 110, a time of day, a day of the week, a gate serial number, among other possibilities.

In some embodiments, gate processor 115 may authenticate the data contained in first barcode 152. This may include one or more of: determining whether the data contained in first barcode 152 conforms with data protocols of transit system 100 (e.g., correct entries and formatting), determining whether the data contained in first barcode 152 includes a valid entry code, determining whether the holder of portable electronic device 150 is a current customer of transit system 100, determining whether the holder of portable electronic device 150 has sufficient funds to pass through gate 110, among other possibilities. For example, when the holder of portable electronic device 150 is entering transit system 100 through gate 110, gate processor 115 may determine whether the holder of portable electronic device 150 has sufficient funds for entering transit system 100 (e.g., funds at least equal to the fare of the least expensive transit route). As another example, when the holder of portable electronic device 150 is exiting transit system 100 through gate 110, gate processor 115 may determine whether the holder of portable electronic device 150 has sufficient funds for the completed route.

After authenticating the data contained in first barcode 152, gate processor 115 may cause audio system 120 to output a gate audio signal 154 which may be received by a microphone of portable electronic device 150. The gate audio signal 154 may have a predetermined feature that may need to be detected by portable electronic device 150 in order for communication between gate 110 and portable electronic device 150 to continue. In some instances, the predetermined feature may include one or more of: a frequency of gate audio signal 154, a phase of gate audio signal 154, an amplitude of gate audio signal 154, a duration of gate audio signal 154, a message or audiocode modulated onto gate audio signal 154, among other possibilities. In one particular implementation, gate audio signal 154 comprises a sinusoidal signal at a single frequency, the predetermined feature being the frequency of the sinusoidal signal.

After receiving gate audio signal 154 and detecting the predetermined feature, portable electronic device 150 may be caused to display a second barcode 156. Second barcode 156 may indicate the detected feature, and optionally may indicate the identifier corresponding to the holder of portable electronic device 150 and/or the request to enter or exit transit system 100 through gate 110. Barcode reader 106 may read second barcode 156 and may send encrypted or unencrypted data contained in second barcode 156 to gate processor 115. Encrypted data may be decrypted by gate processor 115 (or by media reader 105) using the key. Gate processor 115 may then determine whether the detected feature matches the predetermined feature. If the detected feature matches the predetermined feature, then gate processor 115 may facilitate passage of the holder of portable electronic device 150 through gate 110.

Figure 3A:
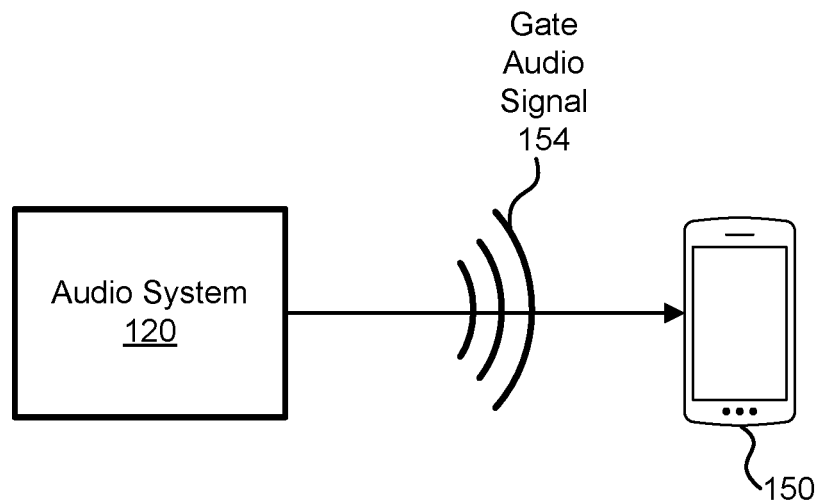
FIG. 3A illustrates a block diagram showing a first step of a method for determining a frequency of a gate audio signal.

FIG. 3A illustrates a block diagram showing a first step of a method for determining a frequency of gate audio signal 154. During the first step, portable electronic device 150 receives gate audio signal 154 and optionally determines an amplitude of gate audio signal 154. Upon receiving gate audio signal 154, portable electronic device 150 may begin to perform the steps described in reference to FIG. 3B.

Figure 3B:
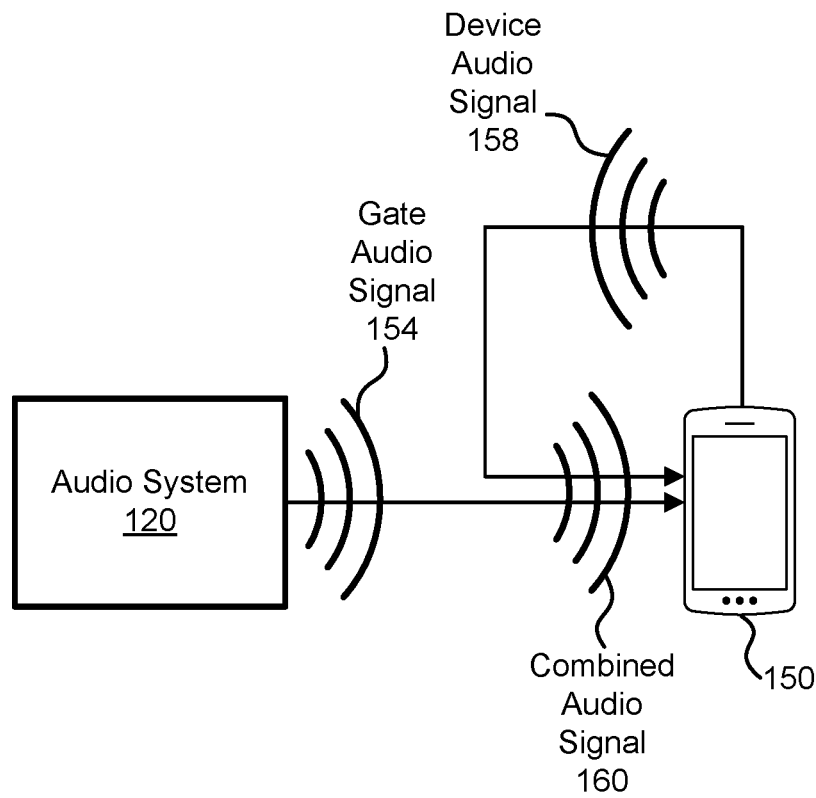
FIG. 3B illustrates a block diagram showing a second step of a method for determining a frequency of a gate audio signal.

FIG. 3B illustrates a block diagram showing a second step of a method for determining a frequency of gate audio signal 154. During the second step, portable electronic device 150 outputs a device audio signal 158 having a test frequency and a test phase, and portable electronic device 150 receives a combined audio signal 160 being a combination of gate audio signal 154 and device audio signal 158. When gate audio signal 154 and device audio signal 158 do not have matching frequencies and opposite phases, the signals constructively interfere and the amplitude of combined audio signal 160 may be large. Conversely, when gate audio signal 154 and device audio signal 158 have matching frequencies and opposite phases, the signals destructively interfere and the amplitude of combined audio signal 160 may be negligible. In this manner, portable electronic device 150 may vary the test frequency and the test phase until destructive interference between gate audio signal 154 and device audio signal 158 is achieved. Portable electronic device 150 may then determine that the test frequency causing the destructive interference is approximately equal to the frequency of gate audio signal 154.

Figure 4:
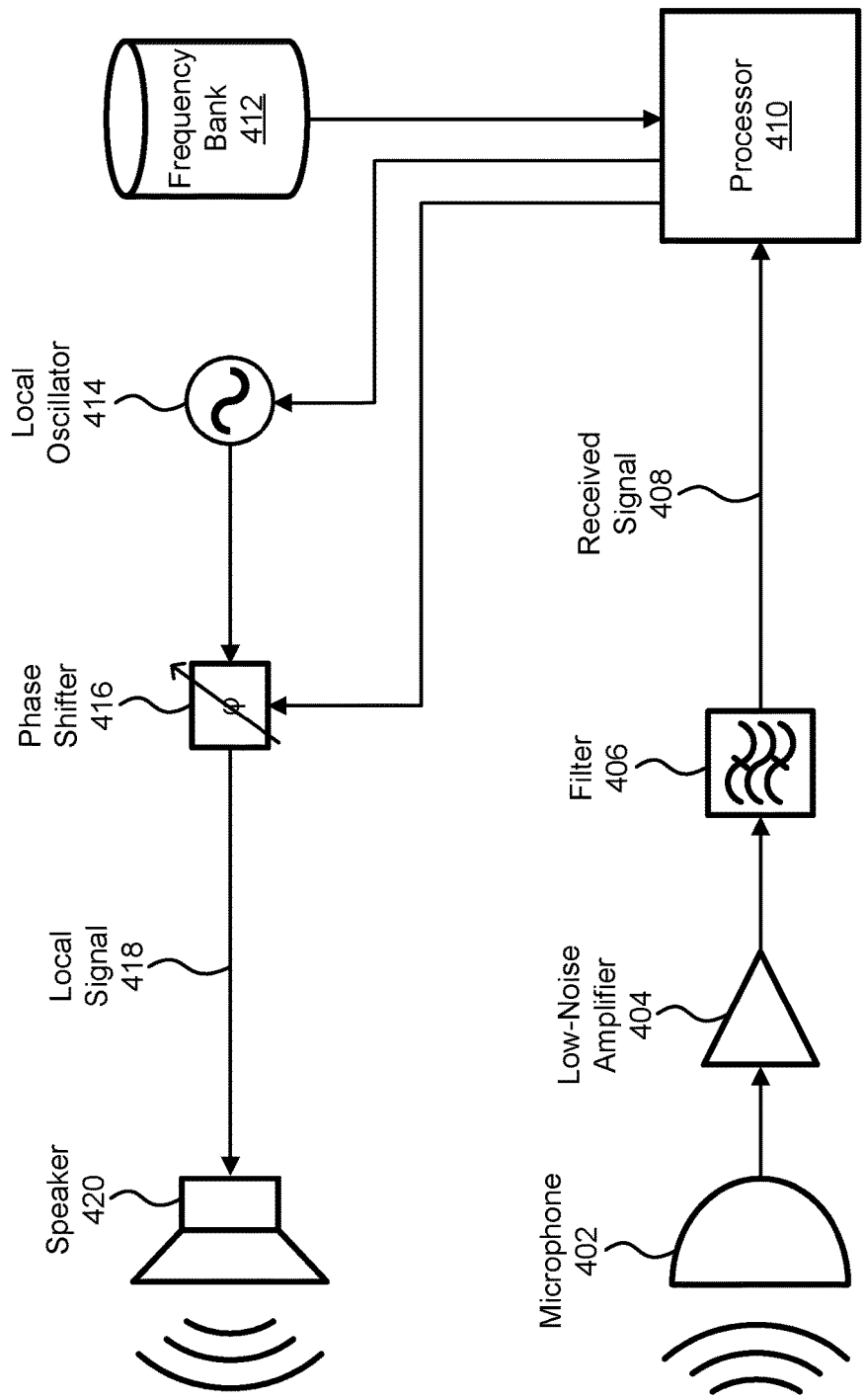
FIG. 4 illustrates a block diagram of a portable electronic device, according to some embodiments of the present disclosure.

FIG. 4 illustrates a block diagram of portable electronic device 150 according to some embodiments of the present disclosure. In the example shown in FIG. 4, portable electronic device 150 includes a microphone 402 for receiving and converting an audio signal into an electronic signal. For example, microphone 402 may convert an audio signal into an electronic signal such as a voltage or a current, the electronic signal having identical or similar amplitude, frequency, and phase characteristics as the audio signal. Portable electronic device 150 may include a low-noise amplifier 404 for amplifying the electronic signal and a filter 406 for filtering out unwanted frequency components. Filter 406 may be low-pass, high-pass, or band-pass filter, among other possibilities. A received signal 408 is received by a processor 410 of portable electronic device 150.

Upon receiving received signal 408, processor 410 may determine an amplitude of received signal 408 and may access frequency bank 412 to determine a test frequency based on the amplitude. In some embodiments, frequency bank 412 may store a plurality of evenly-spaced test frequencies within a particular range. For example, in some embodiments the plurality of test frequencies may range from 50 Hz to 3 kHz. In other embodiments, or in the same embodiments, the plurality of test frequencies may range from 500 Hz to 1500 Hz. Other embodiments may utilize frequencies above or below these ranges. In one particular embodiment, processor 410 may determine an amplitude of received signal 408 and may retrieve a plurality of test frequencies from frequency bank 412 based on the amplitude. Processor 410 may cause a local oscillator 414 to generate a sinusoidal signal having a particular test frequency of the plurality of test frequencies. The phase of the sinusoidal signal may be adjusted by a phase shifter 416 controlled by processor 410. The resulting local signal 418 may be outputted by a speaker 420.

Figure 5:
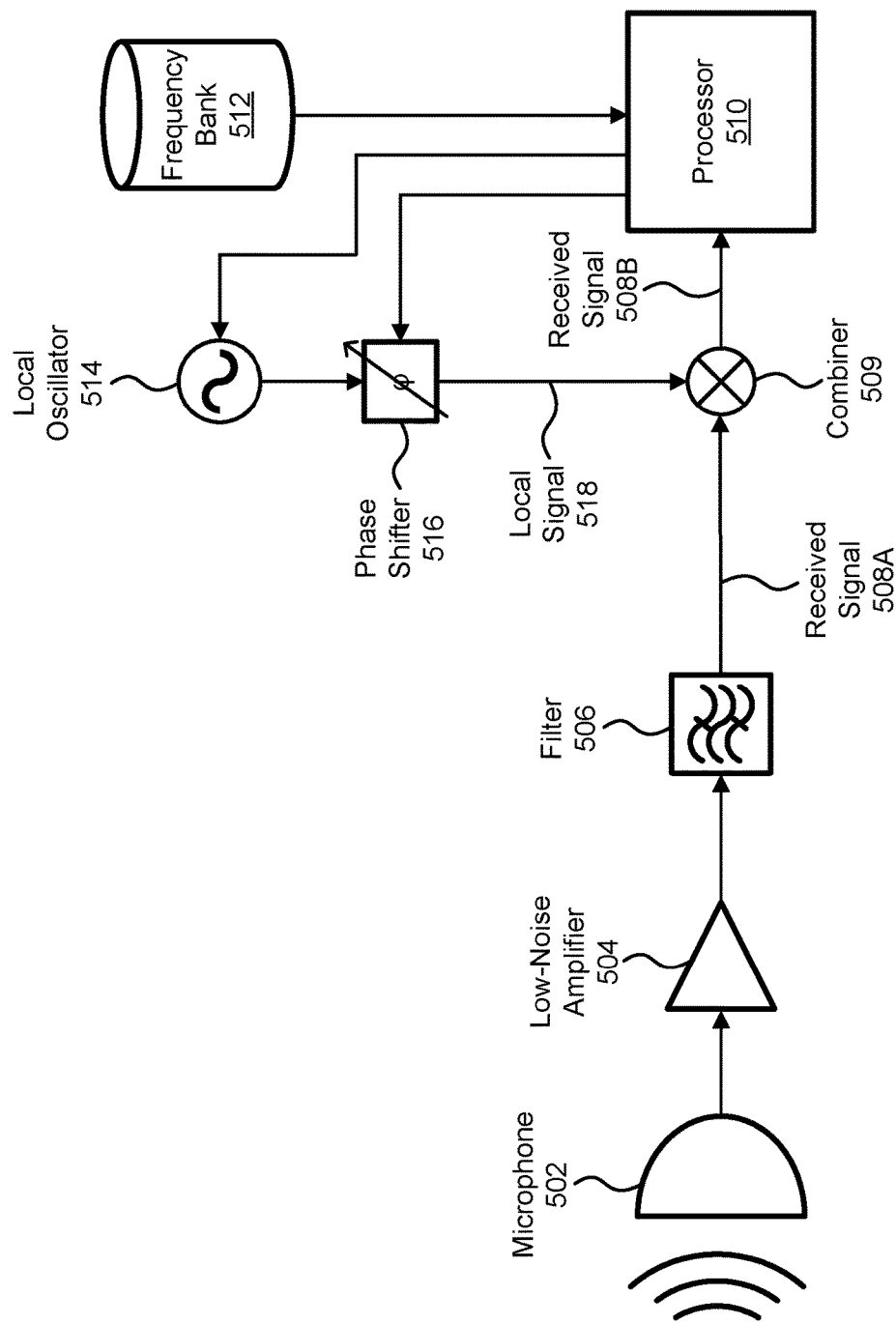
FIG. 5 illustrates a block diagram of a portable electronic device, according to some embodiments of the present disclosure.

FIG. 5 illustrates a block diagram of portable electronic device 150 according to some embodiments of the present disclosure. In the example shown in FIG. 5, portable electronic device 150 includes a microphone 502 for receiving and converting an audio signal into an electronic signal, a low-noise amplifier 504 for amplifying the electronic signal, and a filter 506 for filtering out unwanted frequency components. Filter 506 may be low-pass, high-pass, or band-pass filter, among other possibilities. A received signal 508 is received by a processor 510. In some embodiments, a combiner 509 may be utilized to combine a received signal 508A with a local signal 518 to generate a received signal 508B. Combiner 509 may function as an adder such that received signal 508B is a summation of received signal 508A and local signal 518.

Upon receiving received signal 508, processor 510 may determine an amplitude of received signal 508 and may access frequency bank 512 to determine a test frequency based on the amplitude. In some embodiments, frequency bank 512 may have similar properties to frequency bank 412. Processor 510 may cause a local oscillator 514 to generate a sinusoidal signal having a particular test frequency of the plurality of test frequencies. The phase of the sinusoidal signal may be adjusted by a phase shifter 516 controlled by processor 510. The resulting local signal 518 may be combined with received signal 508A.

The different architectures illustrated in FIGS. 4 and 5 represent two different approaches for quickly determining the frequency of gate audio signal 154. The approach illustrated in FIG. 4 may utilize more hardware components than the approach illustrated in FIG. 5 (e.g., speaker 420), but may offer superior frequency detection due to the noise in device audio signal 158 being similar or comparable to the noise in gate audio signal 154. On the other hand, the approach illustrated in FIG. 5 may require fewer hardware components but may offer less accurate frequency detection due to local signal 518 having dissimilar characteristics to gate audio signal 154.

Figure 6:
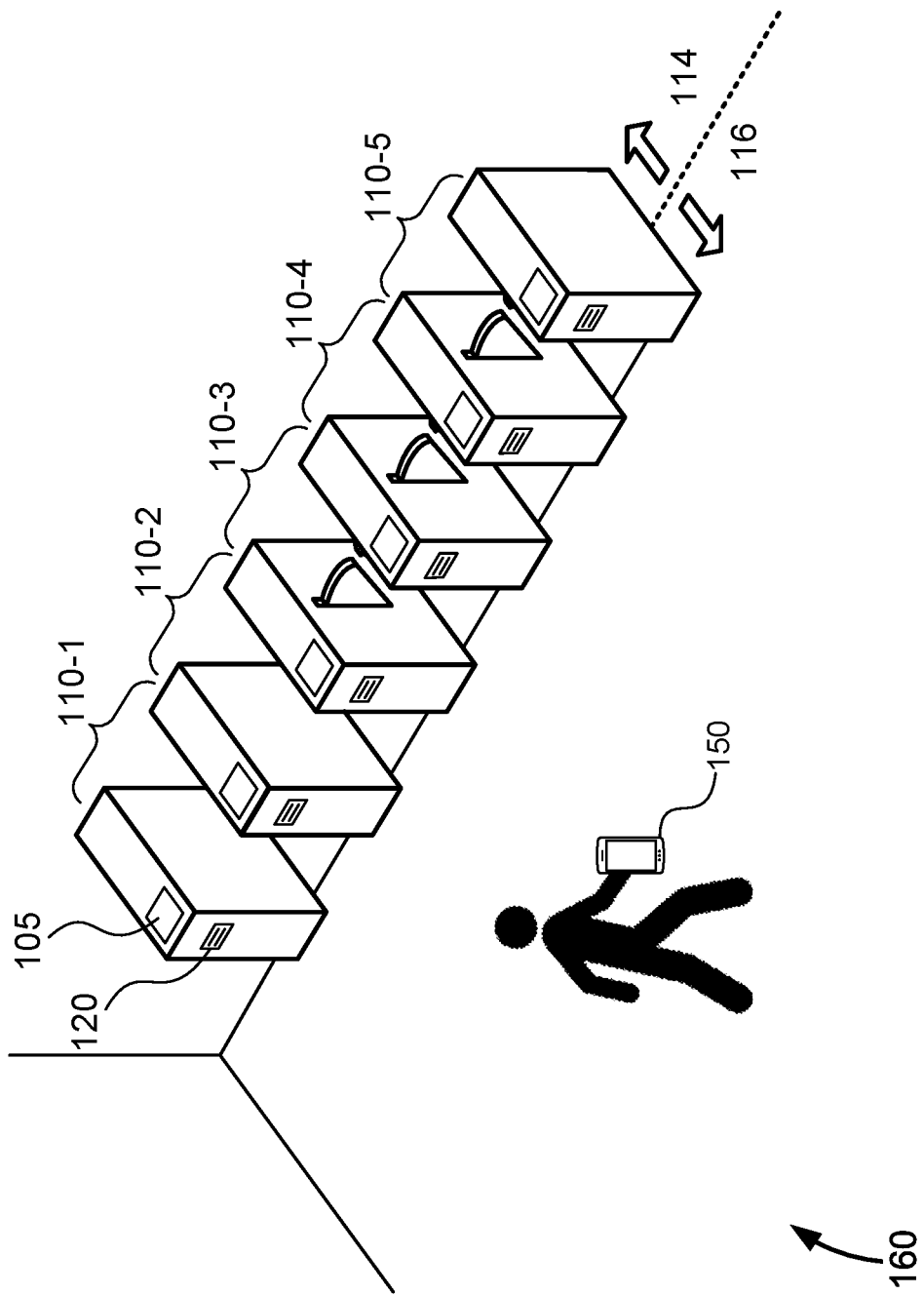
FIG. 6 illustrates an example of a transit location, according to some embodiments of the present disclosure.

FIG. 6 illustrates an example of transit location 160, according to some embodiments of the present disclosure. Transit location 160 as shown in FIG. 6 may correspond to a bus or train station, among other possibilities. Transit location 160 may include a plurality of gates 110 separating a restricted access area 114 from a non-restricted access area 116. One or more of gates 110 may be barrierless (i.e., "gateless") (e.g., gates 110-1 and 110-2) and one or more of gates 110 may include barriers (e.g., gates 110-3, 110-4, and 110-5). Each of gates 110 may include media reader 105 positioned along one or both sides of the passageways formed by each of gates 110. Each of gates 110 may also include audio system 120 positioned near media reader 105 such that portable electronic device 150 may be near audio system 120 when a barcode displayed by portable electronic device 150 is read by media reader 105.

Figure 7:
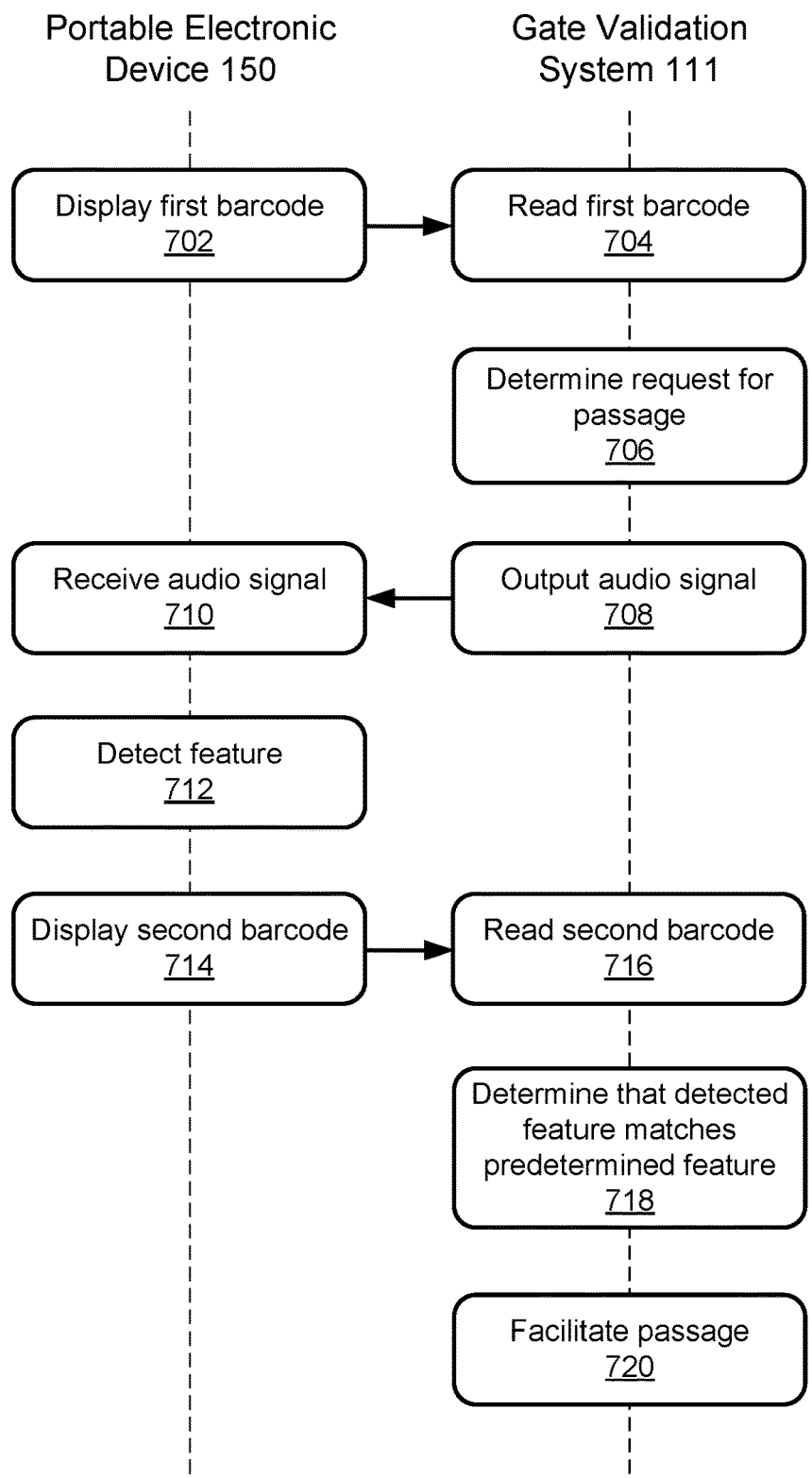
FIG. 7 illustrates a method for implementing an audio assisted dynamic barcode system.

FIG. 7 illustrates a method 700 for implementing an audio assisted dynamic barcode system. Steps of method 700 need not be performed in the order shown, and not all steps of method 700 need be performed during performance of method 700.

At step 702, first barcode 152 is displayed by portable electronic device 150. In some embodiments, first barcode 152 indicates a request for passage through gate 110. In some embodiments, first barcode 152 indicates an identifier corresponding to a holder of portable electronic device 150.

In some embodiments, portable electronic device 150 may encrypt first barcode 152 (i.e., the information contained in first barcode 152) using a key. The key may be based on location 160, a time of day, a day of the week, a gate serial number, among other possibilities.

At step 704, first barcode 152 is read by gate validation system 111. Gate validation system 111 may decrypt first barcode 152 (i.e., the information contained in first barcode 152) using the same key or a different key than was used by portable electronic device 150 to encrypt first barcode 152.

At step 706, gate validation system 111 determines that first barcode 152 indicates a request for passage through gate 110. In some embodiments, first barcode 152 may explicitly include information (e.g., text) stating that the holder of portable electronic device 150 is requesting passage through gate 110. For example, the holder of portable electronic device 150 may open an application and cause first barcode 152 to be generated so as to explicitly include the information stating that the holder of portable electronic device 150 is requesting passage through gate 110. In other embodiments, or in the same embodiments, the determination that first barcode 152 indicates a request for passage may be made based merely on a determination that the holder of portable electronic device 150 caused first barcode 152 to be generated in anticipation of passing through gate 110. Other possibilities are contemplated.

At step 708, gate audio signal 154 is outputted by gate validation system 111. In some embodiments, step 708 is performed in response to performing step 704 and/or step 706. For example, gate validation system 111 may immediately output gate audio signal 154 upon reading first barcode 152 and/or upon determining that first barcode 152 indicates a request for passage through gate 110. In some embodiments, gate audio signal 154 may be generated by gate validation system 111 so as to have a predetermined feature that may need to be detected by portable electronic device 150 in order for communication between gate validation system 111 and portable electronic device 150 to continue. In some instances, the predetermined feature may include one or more of: a frequency of gate audio signal 154, a phase of gate audio signal 154, an amplitude of gate audio signal 154, a duration of gate audio signal 154, a message or audiocode modulated onto gate audio signal 154, among other possibilities.

At step 710, gate audio signal 154 is received by portable electronic device 150. In some embodiments, gate audio signal 154 is received by a microphone of portable electronic device 150 (e.g., microphones 402 or 502) and is sent to a processor of portable electronic device 150 (e.g., processors 410 or 510). In some embodiments, the microphone of portable electronic device 150 may be activated (i.e., begin receiving audio signals) when step 702 is performed thereby improving battery life of the device.

At step 712, a feature of gate audio signal 154 is detected by portable electronic device 150. In some embodiments, the feature of gate audio signal 154 is detected by detecting the frequency of gate audio signal 154. In some embodiments, the feature of gate audio signal 154 is detected by detecting the phase of gate audio signal 154. In some embodiments, the feature of gate audio signal 154 is detected by detecting the amplitude of gate audio signal 154. In some embodiments, the feature of gate audio signal 154 is detected by detecting the duration of gate audio signal 154. In some embodiments, the feature of gate audio signal 154 is detected by detecting the message or audiocode modulated onto gate audio signal 154. In some embodiments, the category of the feature of gate audio signal 154 is the same for all gates of transit system 100 (e.g., the feature may always be the frequency of gate audio signal 154). In some embodiments, the category of the feature is based on location 160, a time of day, a day of the week, a gate serial number, among other possibilities.

At step 714, second barcode 156 is displayed by portable electronic device 150. In some embodiments, second barcode 156 indicates the request for passage through gate 110 and/or the identifier corresponding to a holder of portable electronic device 150. In some embodiments, portable electronic device 150 may encrypt second barcode 156 (i.e., the information contained in second barcode 156) using the same key or a different key than was used by portable electronic device 150 to encrypt first barcode 152.

At step 716, second barcode 156 is read by gate validation system 111. Gate validation system 111 may decrypt second barcode 156 (i.e., the information contained in second barcode 156) using the same key or a different key than was used by portable electronic device 150 to encrypt first barcode 152.

At step 718, gate validation system 111 determines that the detected feature of gate audio signal 154 matches the predetermined feature of gate audio signal 154. In some embodiments, the detected feature may match the predetermined feature when the detected feature is within an absolute threshold or a percentage threshold of the predetermined feature. For example, in some embodiments the detected feature may match the predetermined feature when the detected feature is within 0.01%, 0.1%, or 1% of the predetermined feature. As another example, a detected frequency may match a predetermined frequency when the detected frequency is within 0.1 Hz, 1 Hz, 10 Hz, or 100 Hz of the predetermined frequency. As another example, a detected duration may match a predetermined duration when the detected duration is within 1 ms, 10 ms, or 100 ms of the predetermined duration.

At step 720, passage of the holder of portable electronic device 150 through gate 110 is facilitated by gate validation system 111. In some embodiments, facilitating passage of the holder of portable electronic device 150 includes storing a record (e.g., entry record or exit record) at central data store 144. The record may identify one or more of: the holder of portable electronic device 150, location 160, gate 110, a time stamp, a payment amount, a hold amount, among other possibilities. In some embodiments, facilitating passage of the holder of portable electronic device 150 includes removing a physical barrier of gate 110, such as raising a lift gate or allowing a turnstile to rotate. In some embodiments, facilitating passage of the holder of portable electronic device 150 includes allowing the holder to pass through gate 110 without activating an alarm which would otherwise be activated.

Figure 8:
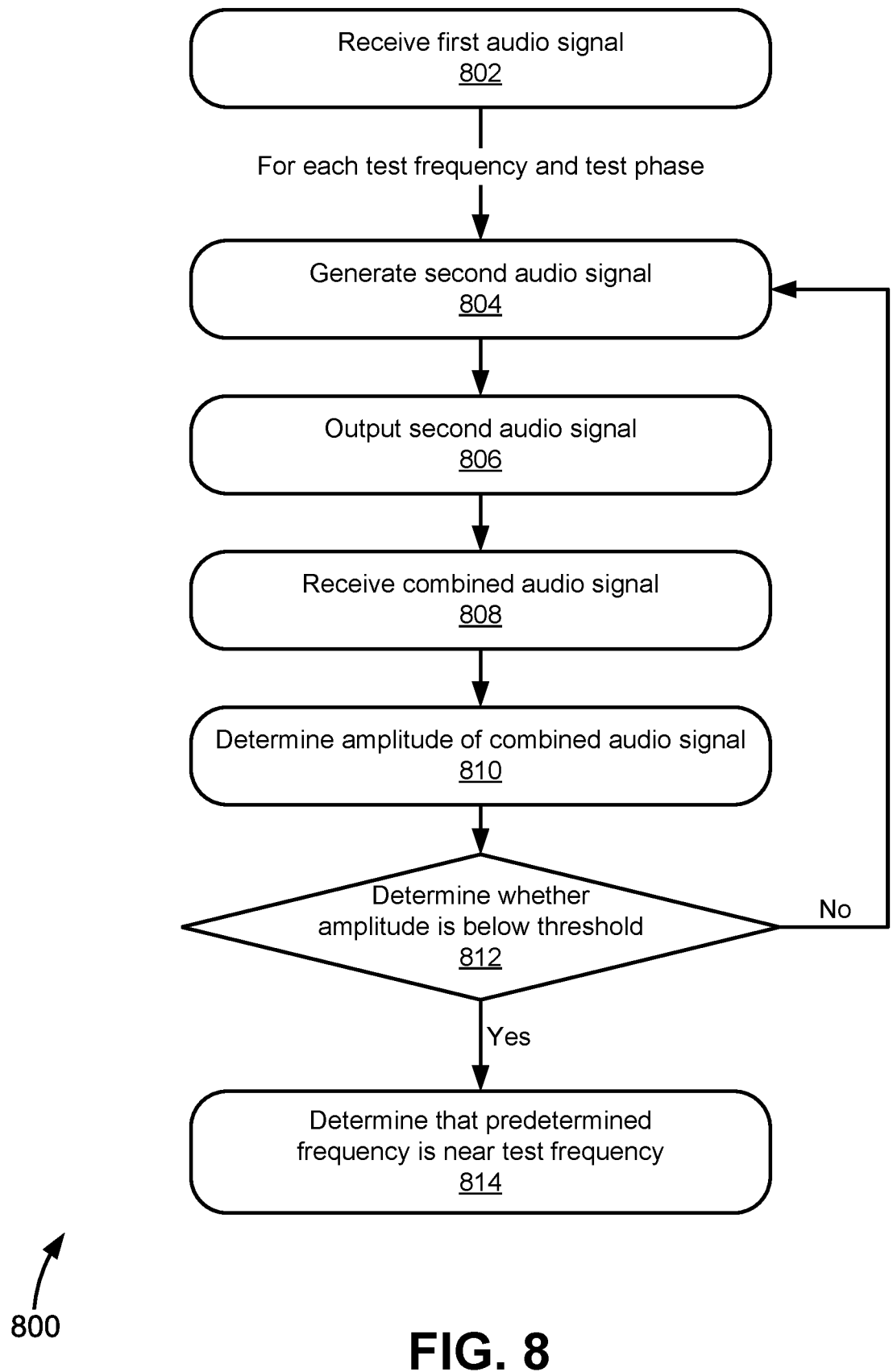
FIG. 8 illustrates a method for determining a frequency of a received audio signal.

FIG. 8 illustrates a method 800 for determining a frequency of a received audio signal. Steps of method 800 need not be performed in the order shown, and not all steps of method 800 need be performed during performance of method 800. In some embodiments, one or more steps of method 800 may be performed as substeps of step 712 of method 700.

At step 802, gate audio signal 154 is received by portable electronic device 150. In some embodiments, gate audio signal 154 is received using a microphone (e.g., microphone 402) of portable electronic device 150. In some embodiments, gate audio signal 154 includes a predetermined frequency which may be set by gate validation system 111 when gate audio signal 154 is generated.

In some embodiments, steps 804 to 812 are performed for each test frequency of a plurality of test frequencies and for each test phase of a plurality of test phases until the loop exit criteria is satisfied at step 812. In some embodiments, prior to performing step 804, the plurality of test frequencies and the plurality of test phases may be determined by portable electronic device 150. This may include retrieving the plurality of test frequencies from frequency bank 412. In some embodiments, an amplitude of gate audio signal 154 may be determined and subsequently the plurality of test frequencies may be determined based on the amplitude of gate audio signal 154. For example, frequency bank 412 may include different sets of test frequencies corresponding to different ranges of the amplitude of gate audio signal 154, such as a first set of test frequencies corresponding to an amplitude between 0 V and 0.5 V, a second set of test frequencies corresponding to an amplitude between 0.5 V and 1 V, and a third set of test frequencies corresponding to an amplitude between 1 V and 1.5 V. In some instances, using amplitude-dependent test frequencies may improve the speed and security of the audio assisted dynamic barcode system. In some embodiments, the plurality of test frequencies may be based on a location of portable electronic device 150, a time of day, and/or a day of the week.

In some embodiments, the plurality of test phases may be evenly spaced phases between 0 degrees and 360 degrees. For example, in one embodiment the plurality of test phases may include 0 degrees and 180 degrees. In another embodiment, the plurality of test phases may include 0 degrees, 120 degrees, and 240 degrees. In another embodiment, the plurality of test phases may include 0 degrees, 90 degrees, and 180 degrees, and 270 degrees. Other embodiments are contemplated having additional test phases with smaller spacings.

At step 804, device audio signal 158 is generated by portable electronic device 150. Device audio signal 158 may be generated by processor 410 controlling local oscillator 414 and phase shifter 416. Device audio signal 158 may be generated to have a frequency being one of the test frequencies and a phase being one of the test phases. In some embodiments, the phases are iterated through first and then the frequencies are iterated through second. For example, performing step 804 a first time may include generating device audio signal 158 having a first frequency and a first phase, performing step 804 a second time may include generating device audio signal 158 having the first frequency and a second phase, and performing step 804 a third time may include generating device audio signal 158 having the first frequency and a third phase. In this manner, processor 410 may cause phase shifter 416 to adjust more frequently than local oscillator 414 thereby improving the speed of the audio assisted dynamic barcode system (due to, e.g., adjustments to phase shifter 416 being performed faster than adjustments to local oscillator 414).

At step 806, device audio signal 158 is outputted by portable electronic device 150. In some embodiments, device audio signal 158 is outputted using a speaker (e.g., speaker 420) of portable electronic device 150. In some embodiments, device audio signal 158 may be outputted concurrently with receiving gate audio signal 154. For example, in some embodiments gate audio signal 154 may have a duration of 200 ms and device audio signal 158 may have a duration of 100 ms corresponding with the last 100 ms of gate audio signal 154.

At step 808, combined audio signal 160 is received by portable electronic device 150. Combined audio signal 160 may be a combined signal of device audio signal 158 and gate audio signal 154 (e.g., a summation of the two signals).

At step 810, an amplitude of combined audio signal 160 is determined. The amplitude may be equal to a single amplitude (at a particular instant in time), an average amplitude (over a period of time), a maximum amplitude (over a period of time), a minimum amplitude (over a period of time), and the like. In some embodiments, the amplitude of combined audio signal 160 may be based on an envelope of combined audio signal 160.

At step 812, it is determined whether the amplitude of combined audio signal 160 is below a threshold. In some embodiments, the threshold is set at or just above a noise floor such that canceled audio signals will have an amplitude below the threshold. If it is determined that the amplitude of combined audio signal 160 is below the threshold (or, in some embodiments, equal to the threshold), then method 800 proceeds to step 814. Otherwise, if it is determined that the amplitude of combined audio signal 160 is above the threshold (or, in some embodiments, equal to the threshold), then method 800 returns to step 804. When step 804 is repeated, a new test frequency and/or a new test phase is selected.

At step 814, it is determined that the predetermined frequency is within a threshold range of the test frequency. The threshold range may be an absolute range or a percentage range. For example, in some embodiments the predetermined frequency may be determined to be within 0.01%, 0.1%, or 1% of the test frequency. As another example, the predetermined frequency may be determined to be within 0.1 Hz, 1 Hz, 10 Hz, or 100 Hz of the test frequency. In some embodiments, if additional time is available, method 800 may return to step 804 and a second plurality of test frequencies within the threshold range may be generated and steps 804 to 812 may be iterated through using the second plurality of test frequencies thereby increasing the accuracy of method 800 to estimate the frequency of the received audio signal.

Figure 9:
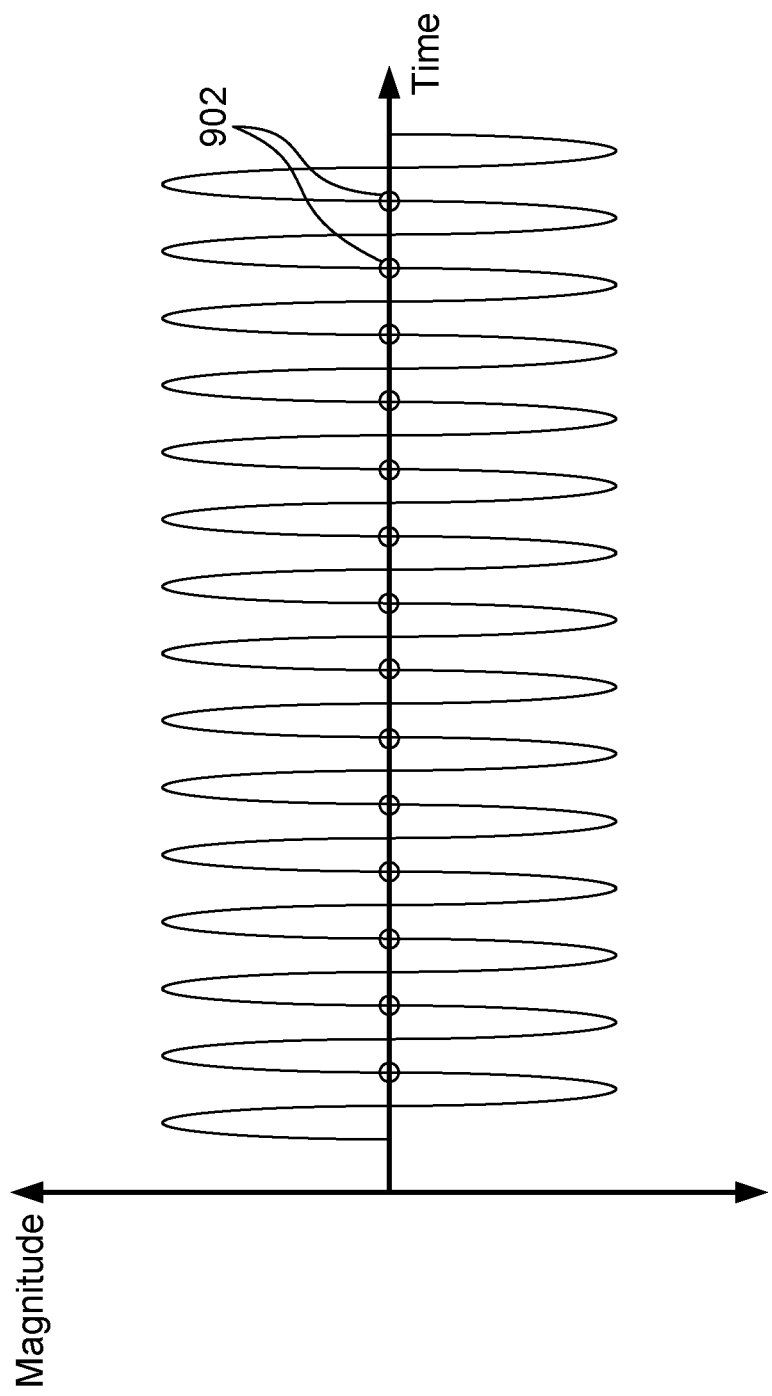
FIG. 9 illustrates a method for determining a frequency of a received audio signal in a low noise environment according to a conventional approach.

FIG. 9 illustrates a method for determining a frequency of a received audio signal in a low noise environment according to a conventional approach. Under the conventional approach, the time between zero crossings 902 of the received signal are measured. The period p of the received signal is estimated as the time between zero crossings 902 and the frequency is estimated as the inverse of the period 1/p. In a low noise environment, the frequency of the received signal could be estimated by a single period. For example, it could theoretically take 1 ms to detect a 1 kHz frequency.

Figure 10:
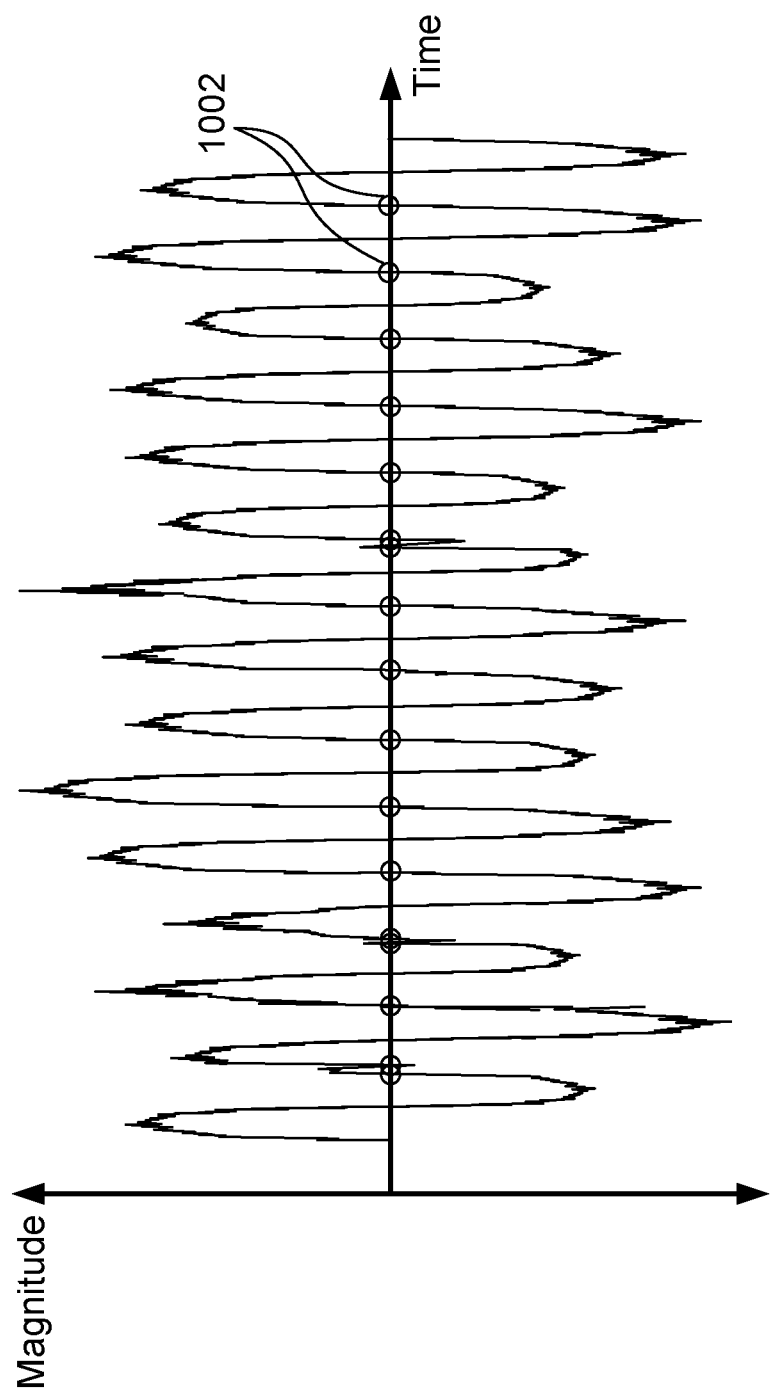
FIG. 10 illustrates a method for determining a frequency of a received audio signal in a noisy environment according to a conventional approach.

FIG. 10 illustrates a method for determining a frequency of a received audio signal according to a conventional approach in a noisy environment. As shown, zero crossings 1002 are less evenly spaced in a noisy environment, reducing the accuracy of the frequency estimate. In some embodiments, averaging multiple zero crossings could take 500 periods or longer of received audio signal to estimate an accurate frequency. For example, it could take 500 ms to detect a 1 kHz frequency.

Figure 11:
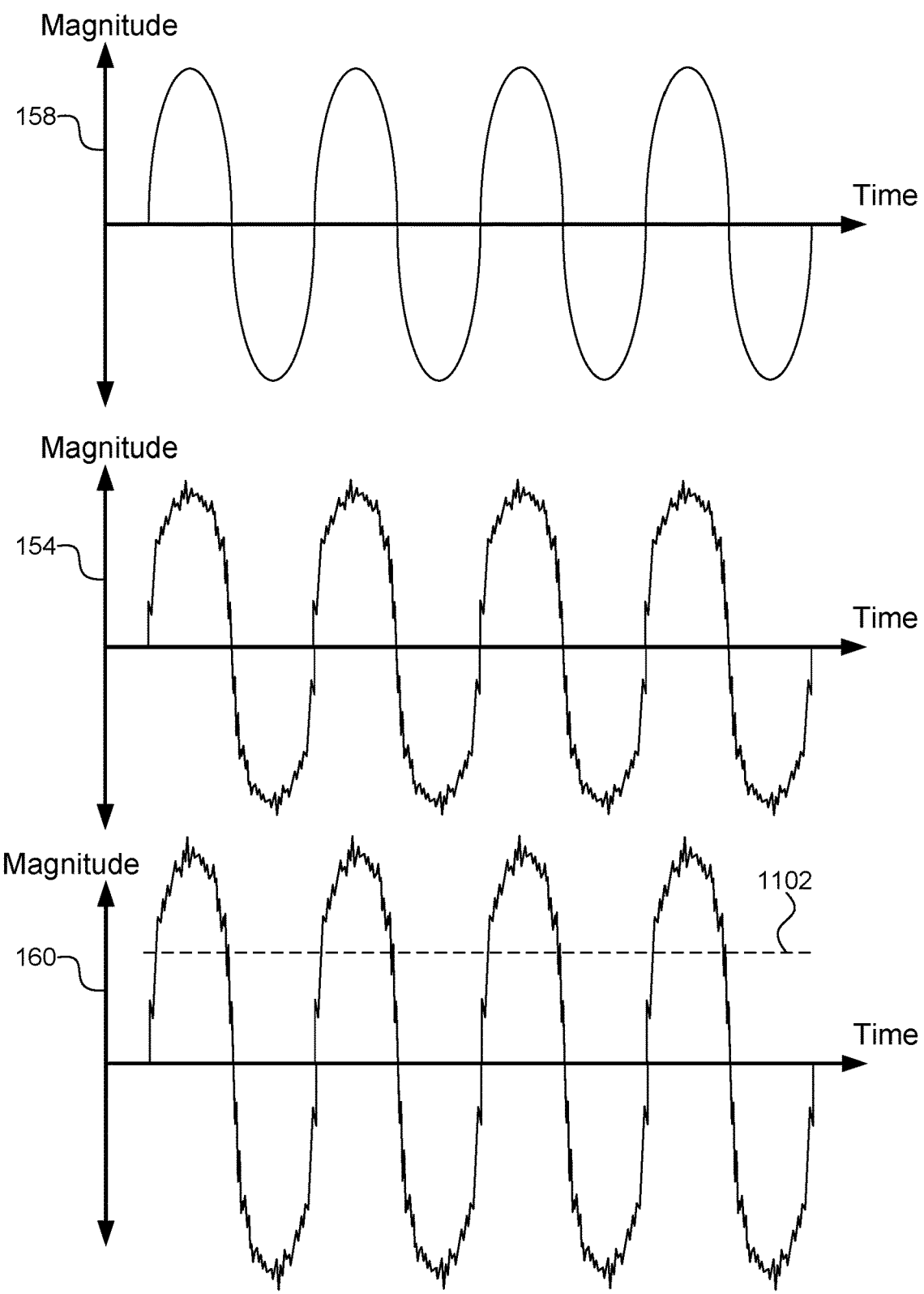
FIG. 11 illustrates a method for determining a frequency of a received audio signal according to some embodiments of the present invention.

FIG. 11 illustrates a method for determining a frequency of a received audio signal according to some embodiments of the present invention. Gate audio signal 154, plotted in the middle of FIG. 11, may be outputted by audio system 120 and device audio signal 158, plotted at the top of FIG. 11, may be outputted by portable electronic device 150 in response to receiving gate audio signal 154. Combined audio signal 160, plotted at the bottom of FIG. 11, may then be received by portable electronic device 150. An amplitude 1102 of combined audio signal 160 may be determined by portable electronic device 150 as the average (positive) magnitude of combined audio signal 160. Because amplitude 1102 is greater than an amplitude threshold (not shown), the method continues by adjusting the frequency and/or phase of device audio signal 158.

Figure 12:
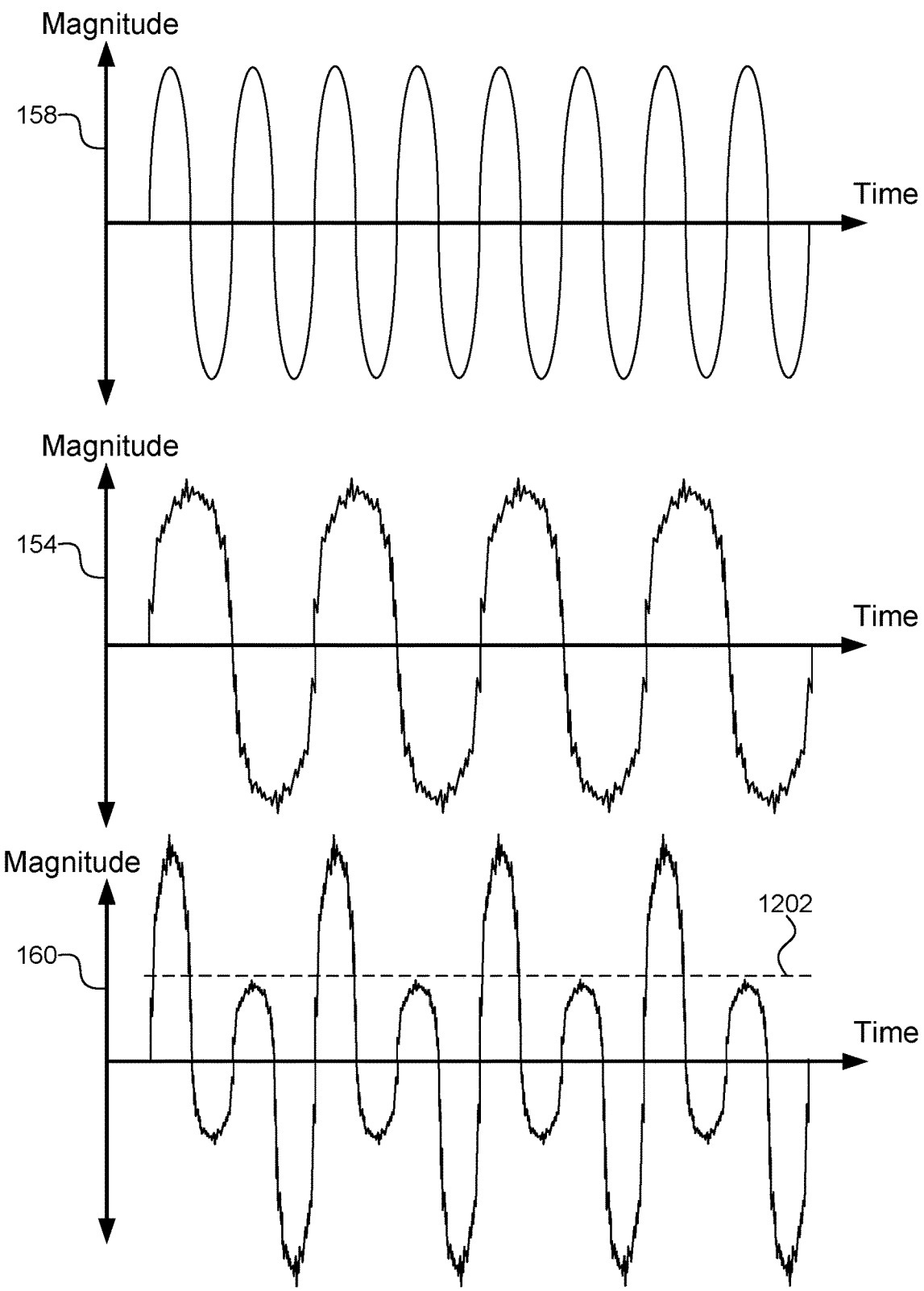
FIG. 12 illustrates a method for determining a frequency of a received audio signal according to some embodiments of the present invention.

FIG. 12 illustrates a method for determining a frequency of a received audio signal according to some embodiments of the present invention. Gate audio signal 154, plotted in the middle of FIG. 12, may be outputted by audio system 120 and device audio signal 158, plotted at the top of FIG. 12, may be outputted by portable electronic device 150. Combined audio signal 160, plotted at the bottom of FIG. 12, may be received by portable electronic device 150 as a combination of gate audio signal 154 and device audio signal 158. An amplitude 1202 of combined audio signal 160 may be determined by portable electronic device 150 as the average (positive) magnitude of combined audio signal 160. Because amplitude 1202 is greater than an amplitude threshold (not shown), the method continues by adjusting the frequency and/or phase of device audio signal 158.

Figure 13:
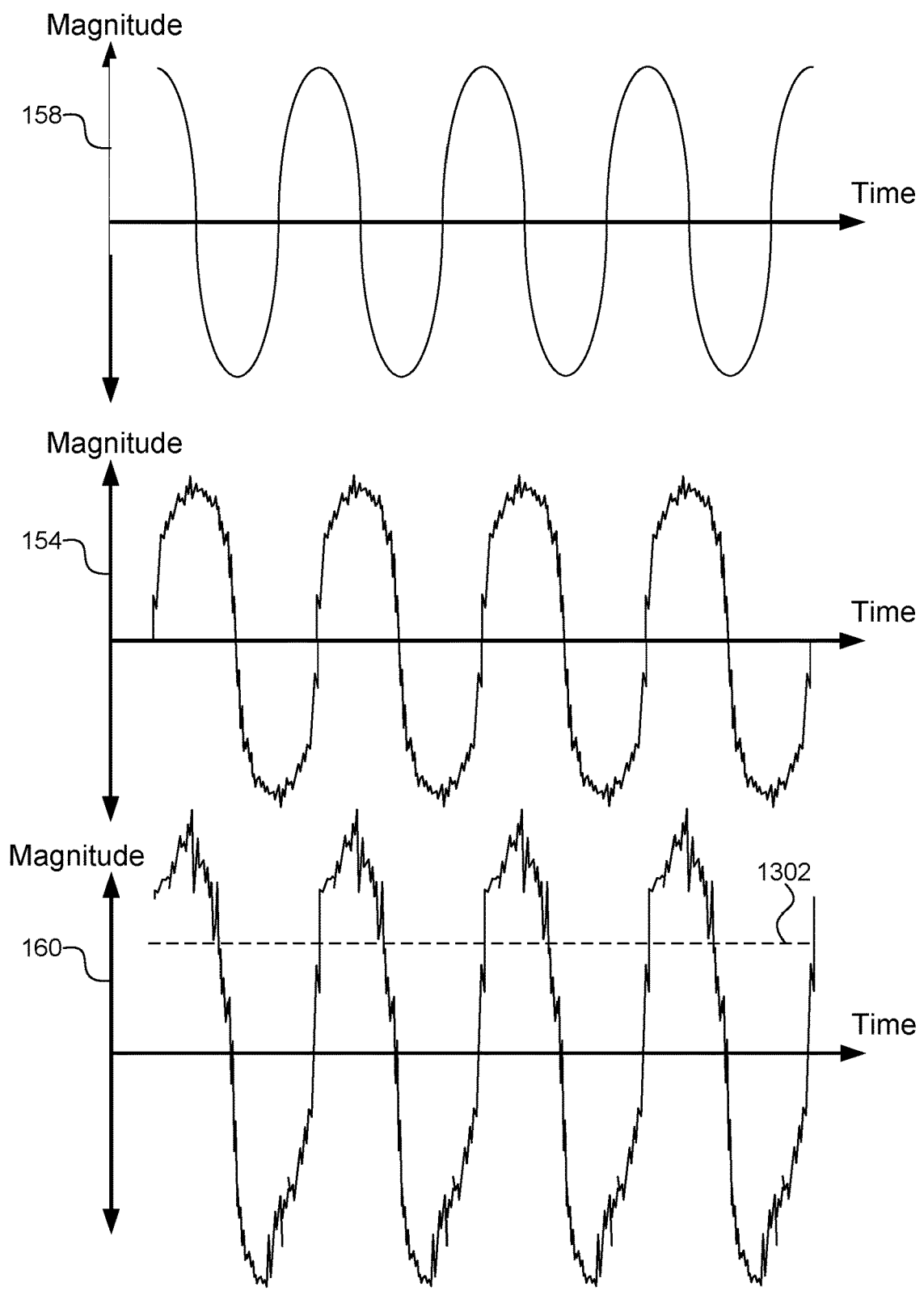
FIG. 13 illustrates a method for determining a frequency of a received audio signal according to some embodiments of the present invention.

FIG. 13 illustrates a method for determining a frequency of a received audio signal according to some embodiments of the present invention. Gate audio signal 154, plotted in the middle of FIG. 13, may be outputted by audio system 120 and device audio signal 158, plotted at the top of FIG. 13, may be outputted by portable electronic device 150. Combined audio signal 160, plotted at the bottom of FIG. 13, may be received by portable electronic device 150 as a combination of gate audio signal 154 and device audio signal 158. An amplitude 1302 of combined audio signal 160 may be determined by portable electronic device 150 as the average (positive) magnitude of combined audio signal 160. Because amplitude 1302 is greater than an amplitude threshold (not shown), the method continues by adjusting the frequency and/or phase of device audio signal 158.

Figure 14:
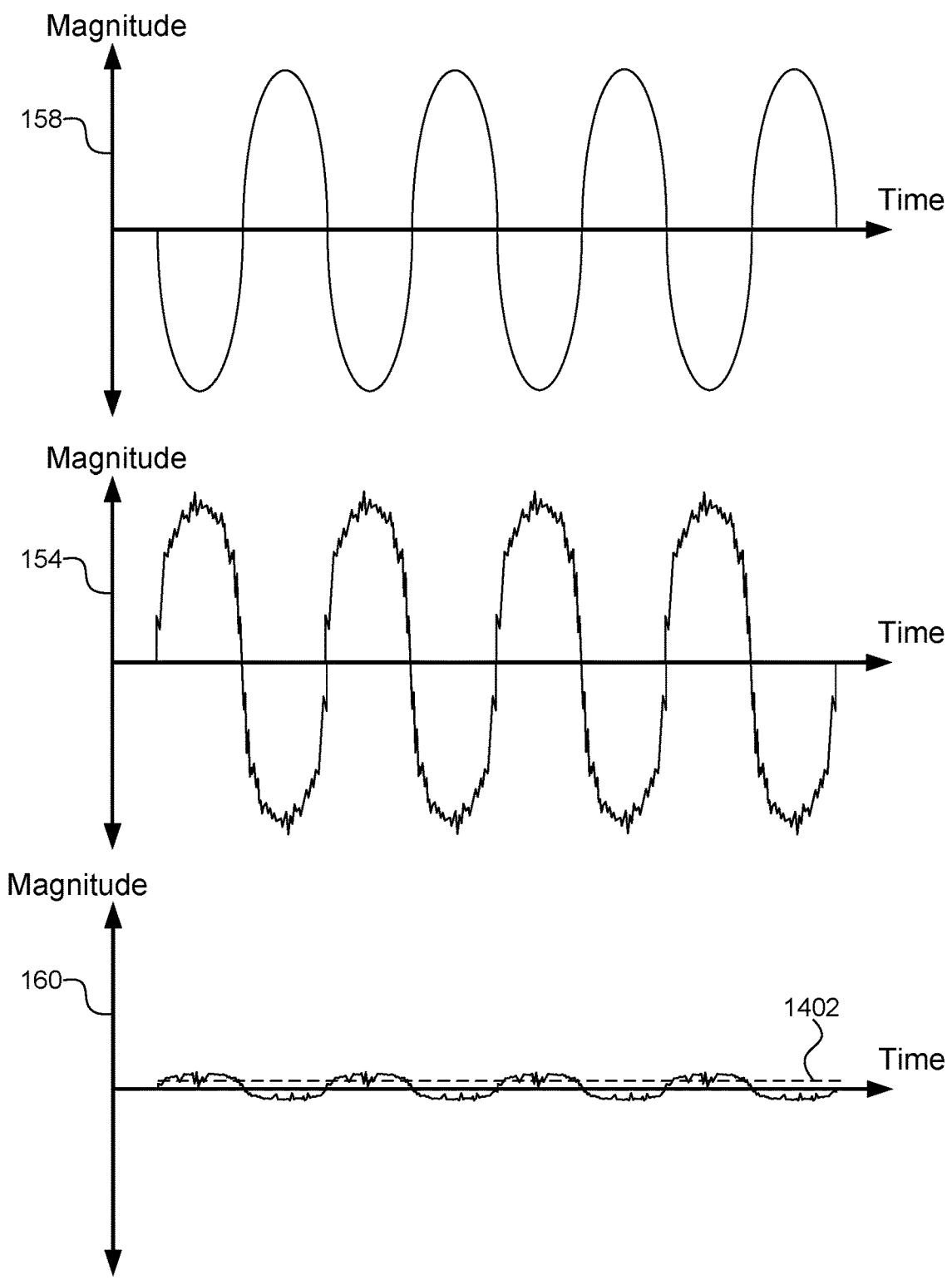
FIG. 14 illustrates a method for determining a frequency of a received audio signal according to some embodiments of the present invention.

FIG. 14 illustrates a method for determining a frequency of a received audio signal according to some embodiments of the present invention. Gate audio signal 154, plotted in the middle of FIG. 14, may be outputted by audio system 120 and device audio signal 158, plotted at the top of FIG. 14, may be outputted by portable electronic device 150. Combined audio signal 160, plotted at the bottom of FIG. 14, may be received by portable electronic device 150 as a combination of gate audio signal 154 and device audio signal 158. An amplitude 1402 of combined audio signal 160 may be determined by portable electronic device 150 as the average (positive) magnitude of combined audio signal 160. Because amplitude 1402 is less than an amplitude threshold (not shown), it is determined that the predetermined frequency of gate audio signal 154 is within a threshold range of the test frequency of device audio signal 158.

Figure 15:
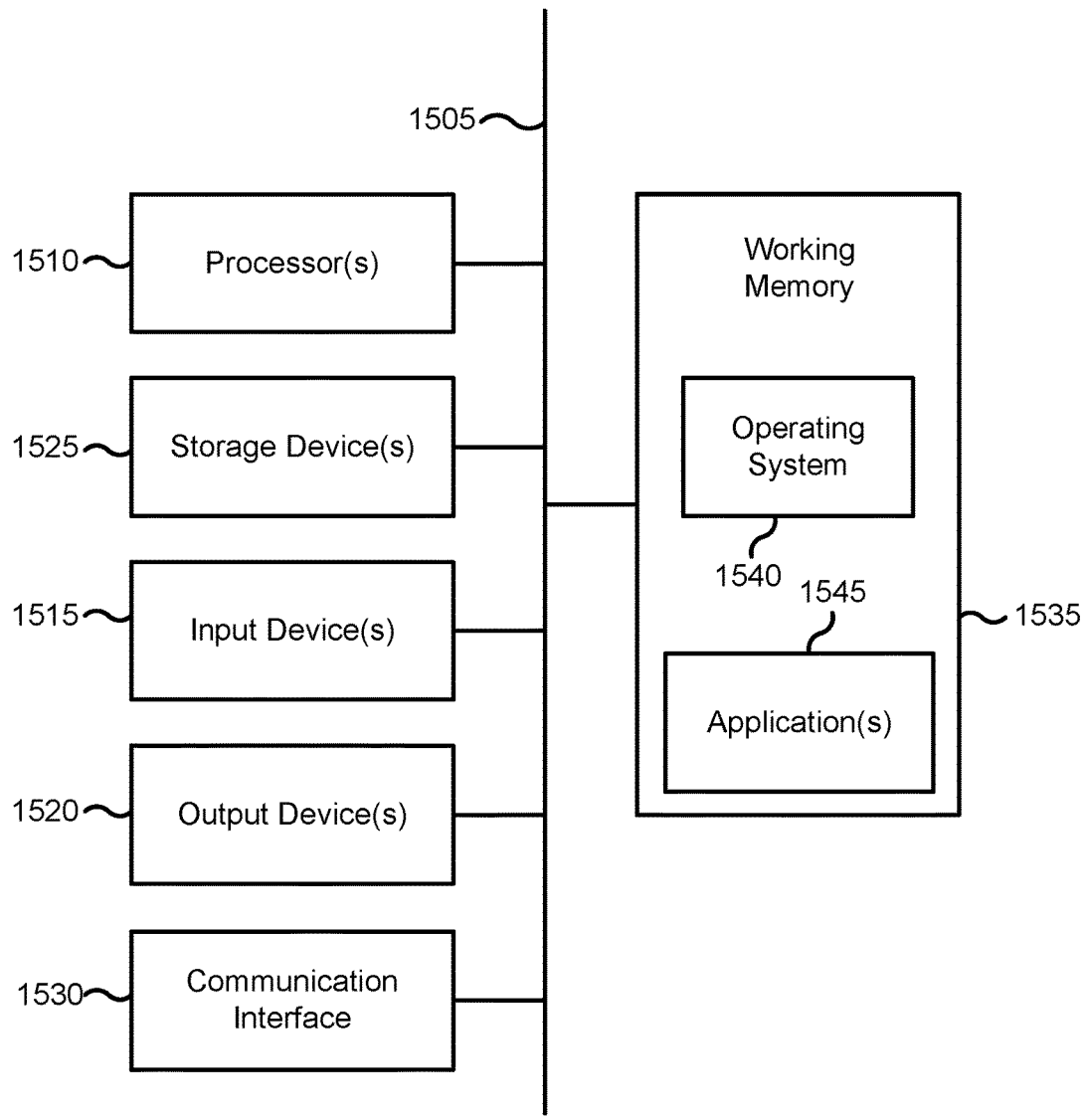
FIG. 15 illustrates a simplified computer system, according to some embodiments of the present disclosure.

FIG. 15 illustrates a simplified computer system 1500, according to some embodiments of the present disclosure. Computer system 1500 may be incorporated as part of the previously described computerized devices. For example, computer system 1500 can represent some of the components of gate validation system 111, portable electronic device 150, transit server 142, and the like. FIG. 15 provides a schematic illustration of one embodiment of a computer system 1500 that can perform the methods provided by various other embodiments, as described herein. FIG. 15 is meant only to provide a generalized illustration of various components, any or all of which may be utilized as appropriate. FIG. 15, therefore, broadly illustrates how individual system elements may be implemented in a relatively separated or relatively more integrated manner.

The computer system 1500 is shown comprising hardware elements that can be electrically coupled via a bus 1505 (or may otherwise be in communication, as appropriate). The hardware elements may include a processing unit 1510, including without limitation one or more general-purpose processors and/or one or more special-purpose processors (such as digital signal processing chips, graphics acceleration processors, and/or the like); one or more input devices 1515, which can include without limitation a keyboard, a touchscreen, receiver, a motion sensor, a camera, a smartcard reader, a contactless media reader, and/or the like; and one or more output devices 1520, which can include without limitation a display device, a speaker, a printer, a writing module, and/or the like.

The computer system 1500 may further include (and/or be in communication with) one or more non-transitory storage devices 1525, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1500 might also include a communication interface 1530, which can include without limitation a modem, a network card (wireless or wired), an infrared communication device, a wireless communication device and/or chipset (such as a Bluetooth™ device, an 802.11 device, a Wi-Fi device, a WiMax device, an NFC device, cellular communication facilities, etc.), and/or similar communication interfaces. The communication interface 1530 may permit data to be exchanged with a network (such as the network described below, to name one example), other computer systems, and/or any other devices described herein. In many embodiments, the computer system 1500 will further comprise a non-transitory working memory 1535, which can include a RAM or ROM device, as described above.

The computer system 1500 also can comprise software elements, shown as being currently located within the working memory 1535, including an operating system 1540, device drivers, executable libraries, and/or other code, such as one or more application programs 1545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a general purpose computer (or other device) to a special purpose computer that is configured to perform one or more operations in accordance with the described methods.

A set of these instructions and/or code might be stored on a computer-readable storage medium, such as the storage device(s) 1525 described above. In some cases, the storage medium might be incorporated within a computer system, such as computer system 1500. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1500 and/or might take the form of source and/or installable code, which, upon compilation and/or installation on the computer system 1500 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 1510, applications 1545, etc.) Further, connection to other computing devices such as network input/output devices may be employed.

Some embodiments may employ a computer system (such as the computer system 1500) to perform methods in accordance with the disclosure. For example, some or all of the procedures of the described methods may be performed by the computer system 1500 in response to processing unit 1510 executing one or more sequences of one or more instructions (which might be incorporated into the operating system 1540 and/or other code, such as an application program 1545) contained in the working memory 1535. Such instructions may be read into the working memory 1535 from another computer-readable medium, such as one or more of the storage device(s) 1525. Merely by way of example, execution of the sequences of instructions contained in the working memory 1535 might cause the processing unit 1510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1500, various computer-readable media might be involved in providing instructions/code to processing unit 1510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1525. Volatile media include, without limitation, dynamic memory, such as the working memory 1535. Transmission media include, without limitation, coaxial cables, copper wire and fiber optics, including the wires that comprise the bus 1505, as well as the various components of the communication interface 1530 (and/or the media by which the communication interface 1530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 1530 (and/or components thereof) generally will receive the signals, and the bus 1505 then might carry the signals (and/or the data, instructions, etc. carried by the signals) to the working memory 1535, from which the processor(s) 1505 retrieves and executes the instructions. The instructions received by the working memory 1535 may optionally be stored on a non-transitory storage device 1525 either before or after execution by the processing unit 1510.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A gate validation system comprising:
    a barcode reader;
    a speaker; and
    a processor communicatively coupled to the barcode reader and the speaker, wherein the processor is configured to perform operations comprising:
        receiving, using the barcode reader, a first barcode from a portable electronic device indicating a request for passage through a gate;
        outputting, using the speaker, an audio signal consisting of a sinusoidal signal having a single predetermined frequency, wherein the predetermined frequency is selected from a set of frequencies;
        receiving, using the barcode reader, a second barcode from the portable electronic device indicating a detected frequency of the audio signal, wherein the set of frequencies is stored within the portable electronic device;
        determining that the detected frequency matches the predetermined frequency; and
        in response to determining that the detected frequency matches the predetermined frequency, facilitating passage of a holder of the portable electronic device through the gate.

2. The gate validation system of claim 1, wherein one or both of the first barcode and the second barcode further indicate an identifier corresponding to the holder of the portable electronic device.

3. The gate validation system of claim 2, wherein facilitating passage of the holder of the portable electronic device through the gate includes storing either an entry record or an exit record including the identifier corresponding to the holder of the portable electronic device.

4. The gate validation system of claim 1, wherein the first barcode and the second barcode are encrypted using a key.

5. The gate validation system of claim 4, wherein the key is based of one or more of:
 a location of the gate;
 a time of day;
 a day of a week; and
 a gate serial number.

6. The gate validation system of claim 4, wherein the operations further comprise:
 decrypting the first barcode using the key; and
 decrypting the second barcode using the key.

7. A method comprising:
 receiving, using a barcode reader, a first barcode from a portable electronic device indicating a request for passage through a gate;
 outputting, using a speaker, an audio signal consisting of a sinusoidal signal having a single predetermined frequency, wherein the predetermined frequency is selected from a set of frequencies;
 receiving, using the barcode reader, a second barcode from the portable electronic device indicating a detected frequency of the audio signal, wherein the set of frequencies is stored within the portable electronic device;
 determining that the detected frequency matches the predetermined frequency; and
 in response to determining that the detected frequency matches the predetermined frequency, facilitating passage of a holder of the portable electronic device through the gate.

8. The method of claim 7, wherein one or both of the first barcode and the second barcode further indicate an identifier corresponding to the holder of the portable electronic device.

9. The method of claim 8, wherein facilitating passage of the holder of the portable electronic device through the gate includes storing either an entry record or an exit record including the identifier corresponding to the holder of the portable electronic device.

10. The method of claim 7, wherein the first barcode and the second barcode are encrypted using a key.

11. The method of claim 10, wherein the key is based of one or more of:
 a location of the gate;
 a time of day;
 a day of a week; and
 a gate serial number.

12. The method of claim 10, further comprising:
 decrypting the first barcode using the key; and
 decrypting the second barcode using the key.

13. A non-transitory computer-readable medium comprising instructions that, when executed by a processor, cause the processor to perform operations comprising:
 receiving, using a barcode reader, a first barcode from a portable electronic device indicating a request for passage through a gate;
 outputting, using a speaker, an audio signal consisting of a sinusoidal signal having a single predetermined frequency, wherein the predetermined frequency is selected from a set of frequencies;
 receiving, using the barcode reader, a second barcode from the portable electronic device indicating a detected frequency of the audio signal, wherein the set of frequencies is stored within the portable electronic device;
 determining that the detected frequency matches the predetermined frequency; and
 in response to determining that the detected frequency matches the predetermined frequency, facilitating passage of a holder of the portable electronic device through the gate.

14. The non-transitory computer-readable medium of claim 13, wherein one or both of the first barcode and the second barcode further indicate an identifier corresponding to the holder of the portable electronic device.

15. The non-transitory computer-readable medium of claim 14, wherein facilitating passage of the holder of the portable electronic device through the gate includes storing either an entry record or an exit record including the identifier corresponding to the holder of the portable electronic device.

16. The non-transitory computer-readable medium of claim 13, wherein the first barcode and the second barcode are encrypted using a key.

17. The non-transitory computer-readable medium of claim 16, wherein the key is based of one or more of:
 a location of the gate;
 a time of day;
 a day of a week; and
 a gate serial number.

18. The non-transitory computer-readable medium of claim 16, wherein the operations further comprise:
 decrypting the first barcode using the key; and
 decrypting the second barcode using the key.

* * * * *